United States Patent
Honda et al.

(10) Patent No.: US 11,711,607 B2
(45) Date of Patent: Jul. 25, 2023

(54) INFORMATION PROCESSING APPARATUS CAPABLE OF APPLYING IMAGE PROCESSING BASED ON EVALUATION RESULTS, IMAGE PROCESSING APPARATUS, AND METHOD OF CONTROLLING THE SAME

(71) Applicant: CANON KABUSHIKI KAISHA, Tokyo (JP)

(72) Inventors: Yoshiaki Honda, Tokyo (JP); Hiroshi Ogino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/943,935

(22) Filed: Sep. 13, 2022

(65) Prior Publication Data
US 2023/0007169 A1   Jan. 5, 2023

Related U.S. Application Data

(62) Division of application No. 17/151,655, filed on Jan. 18, 2021, now Pat. No. 11,477,367.

(30) Foreign Application Priority Data

Jan. 17, 2020 (JP) ................. 2020-006219
Apr. 7, 2020 (JP) ................. 2020-069279
Nov. 9, 2020 (JP) ................. 2020-186751

(51) Int. Cl.
*H04N 5/232* (2006.01)
*G06T 3/40* (2006.01)
(Continued)

(52) U.S. Cl.
CPC ............... *H04N 23/64* (2023.01); *G06T 3/40* (2013.01); *G06V 40/10* (2022.01); *H04N 23/661* (2023.01); *H04N 23/80* (2023.01)

(58) Field of Classification Search
CPC ........... H04N 5/23222; H04N 5/23206; H04N 5/23229; H04N 1/00127; H04N 1/00167;
(Continued)

(56) References Cited

U.S. PATENT DOCUMENTS 5,367,337 A    11/1994  Pyle et al.
7,391,526 B2*  6/2008  Nishimura ............ H04L 51/066
                                                    715/252
(Continued)

FOREIGN PATENT DOCUMENTS

JP    2003-259281 A    9/2003

*Primary Examiner* — Hung H Lam
(74) *Attorney, Agent, or Firm* — Cowan, Liebowitz & Latman, P.C.

(57) ABSTRACT

According to an aspect of the disclosure, an information processing apparatus comprising a communication circuit and a control circuit is provided. The control circuit transmits reduced image data of captured image data, to a first external apparatus through the communication circuit; receives, from the first external apparatus, a result of evaluation processing applied to the reduced image data; on the basis of the result of the evaluation processing, determines whether to apply image processing to the captured image data corresponding to the reduced image data, by a second external apparatus; transmits the captured image data that is determined to be applied the image processing, to the second external apparatus through the communication circuit; and receives, from the second external apparatus, a result of the image processing applied to the captured image data.

6 Claims, 28 Drawing Sheets

(51) Int. Cl.
*H04N 23/60* (2023.01)
*G06V 40/10* (2022.01)
*H04N 23/80* (2023.01)
*H04N 23/661* (2023.01)

(58) Field of Classification Search
CPC .......... H04N 1/00172; H04N 1/00185; H04N 1/00204; H04N 2101/00; H04N 5/23203; H04N 5/23219; H04N 1/21; G06T 3/40; G06V 40/10; G06V 20/52; G06V 40/173
See application file for complete search history.

(56) References Cited

U.S. PATENT DOCUMENTS

| | | | |
|---|---|---|---|
| 8,160,550 B2* | 4/2012 | Oh | H04M 1/7243 455/412.2 |
| 10,200,373 B2* | 2/2019 | Lee | H04L 63/10 |
| 2007/0276849 A1* | 11/2007 | Konno | H04W 4/18 |
| 2008/0288499 A1* | 11/2008 | Choi | G06F 16/54 707/999.009 |
| 2012/0224787 A1 | 9/2012 | Imai | |
| 2016/0239726 A1 | 8/2016 | Yu | |
| 2018/0135996 A1 | 5/2018 | Hung | |
| 2020/0007845 A1 | 1/2020 | Fukuyasu | |
| 2021/0192004 A1 | 1/2021 | Wang | |

* cited by examiner

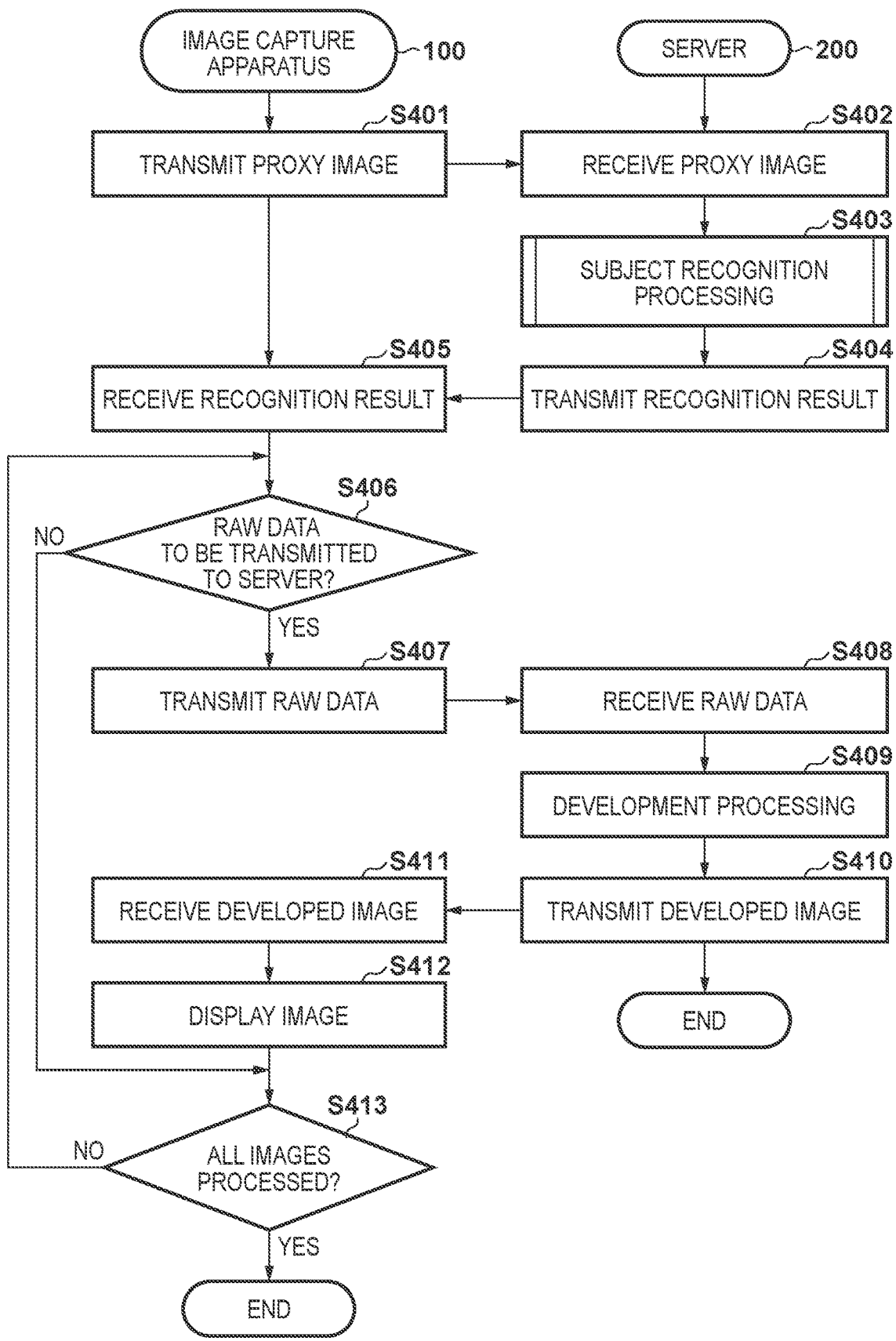

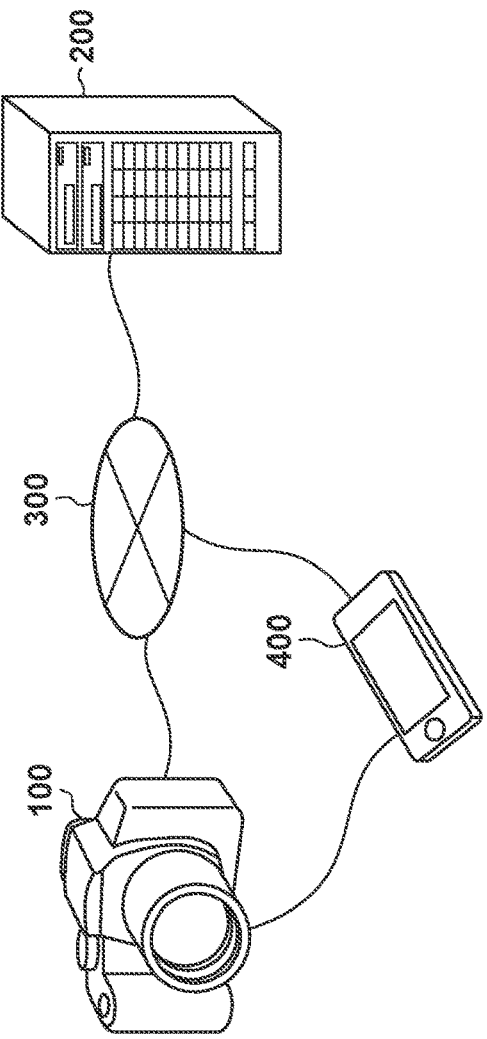
F I G. 5A
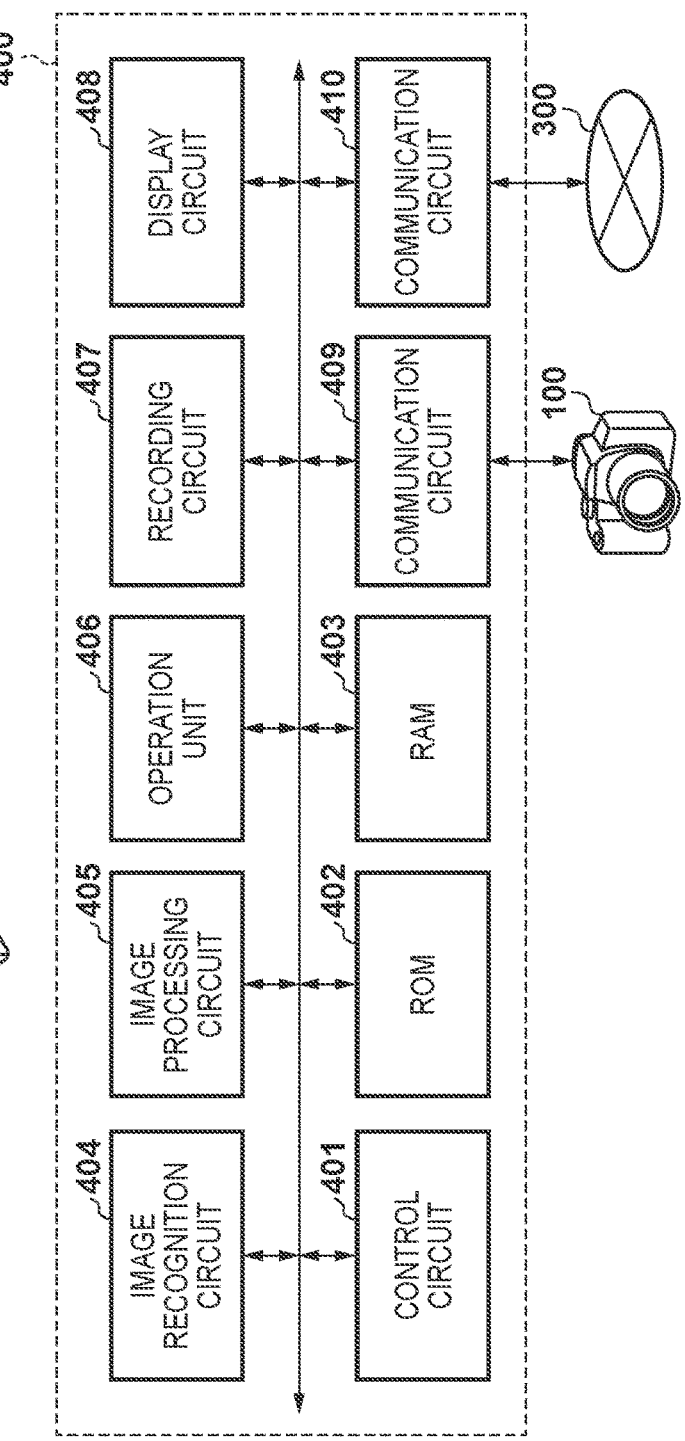
F I G. 5B

F I G. 9
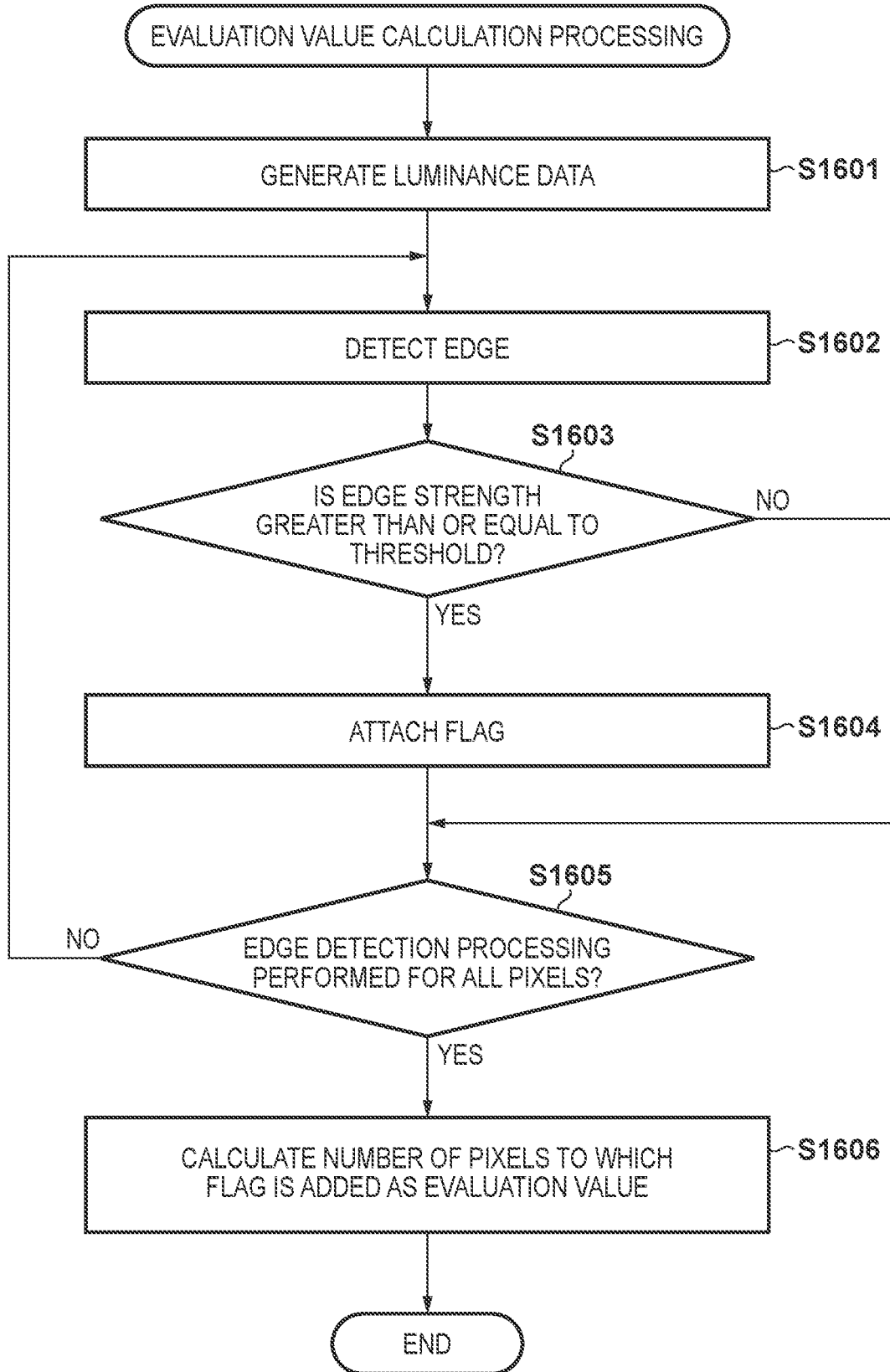

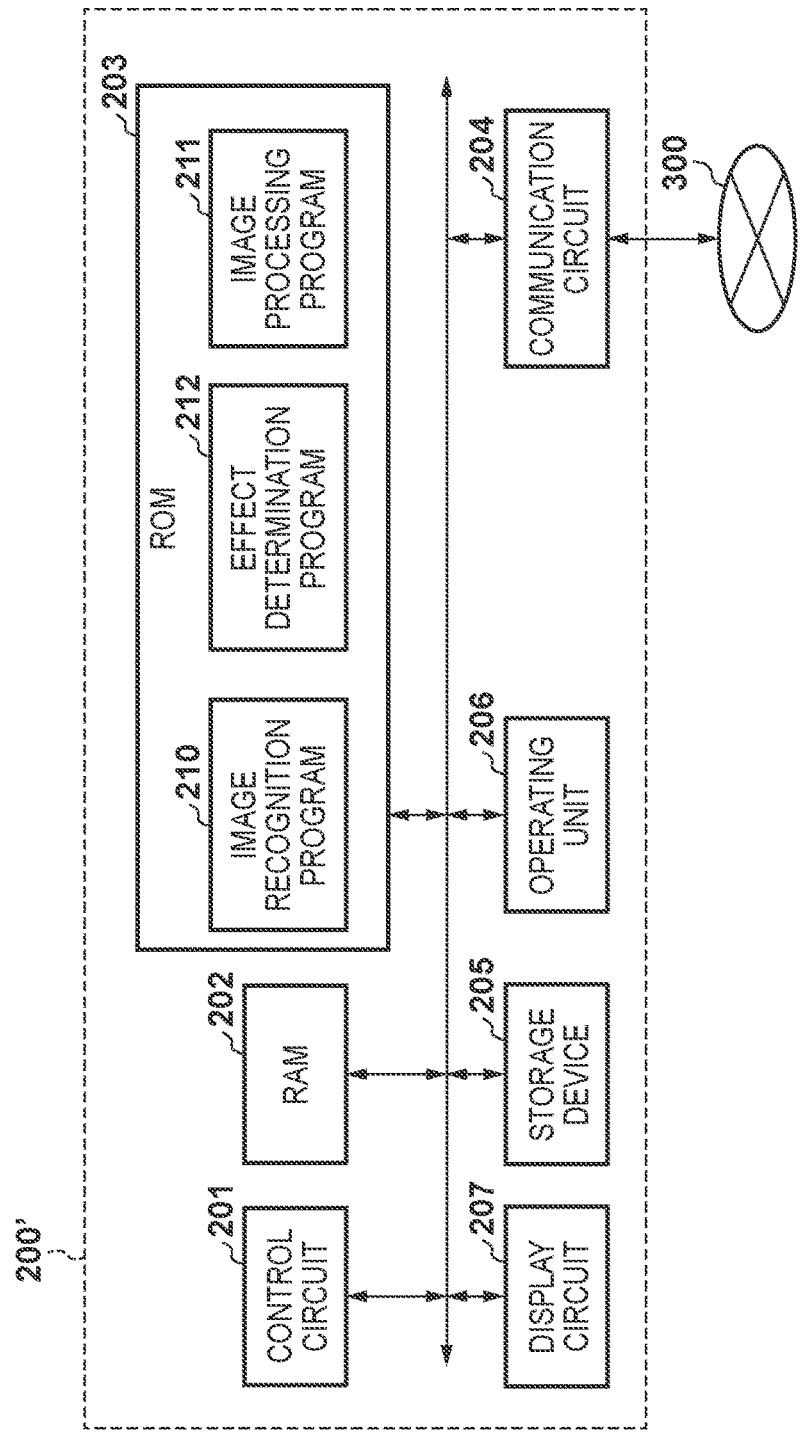

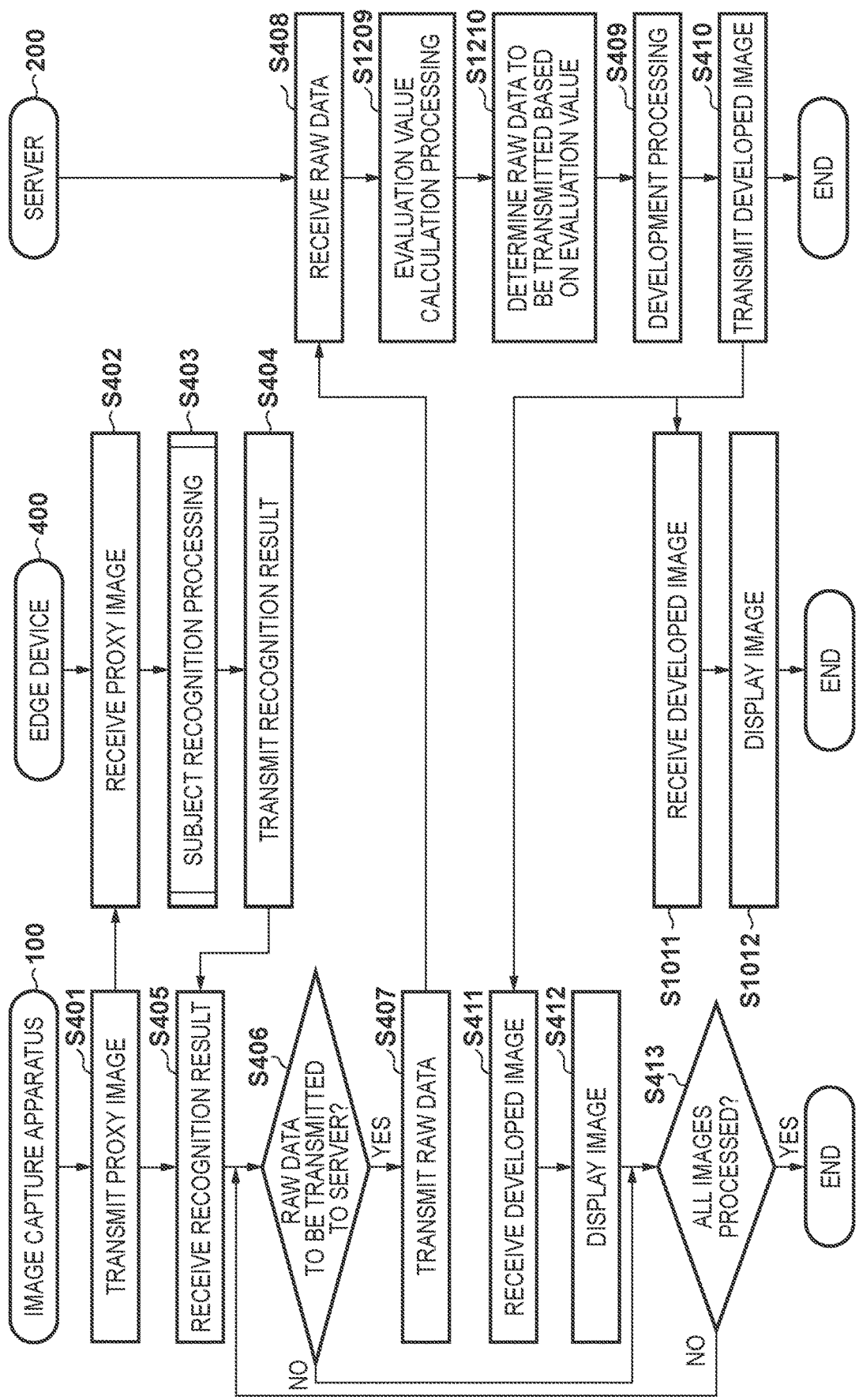

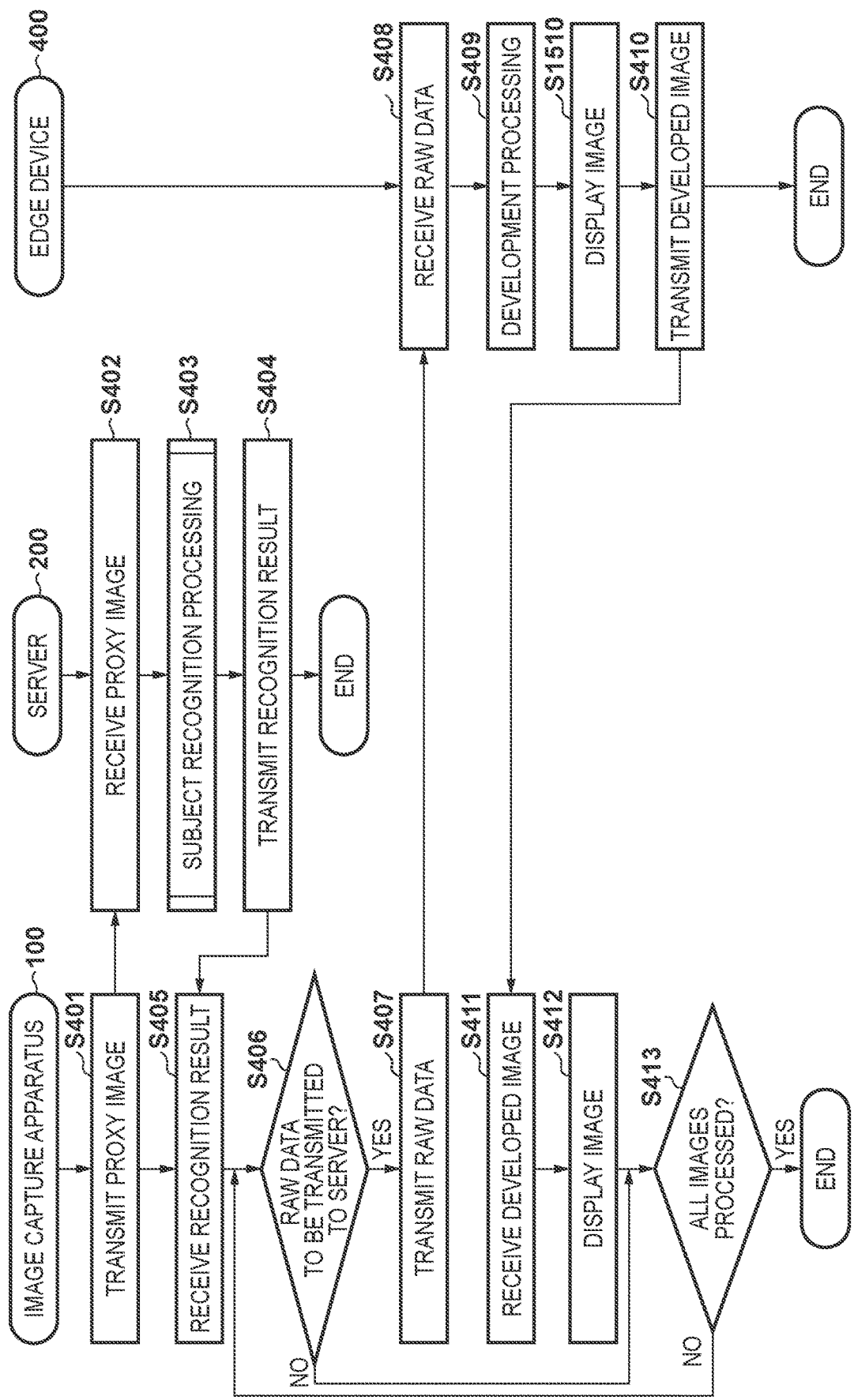

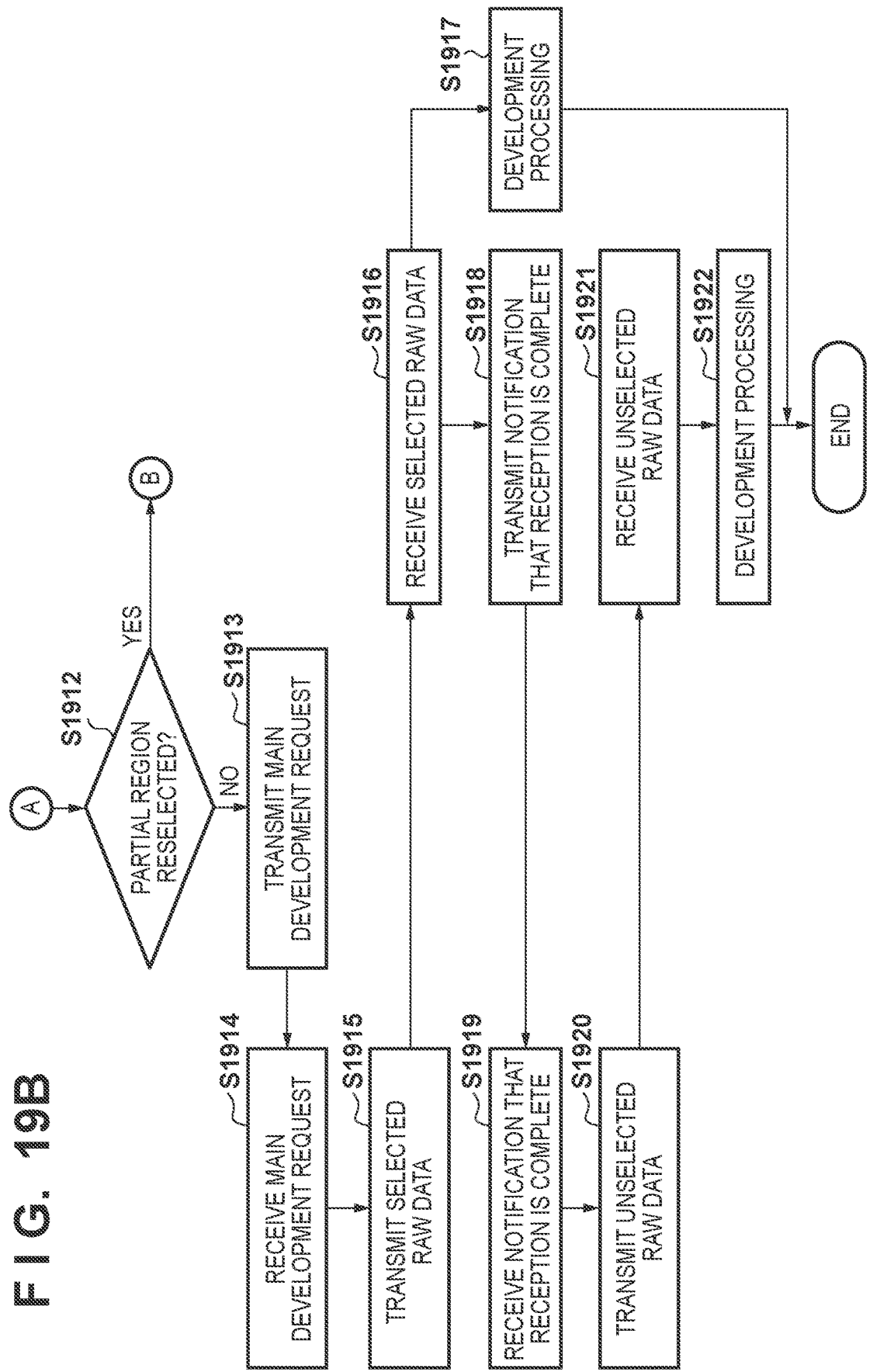

INFORMATION PROCESSING APPARATUS CAPABLE OF APPLYING IMAGE PROCESSING BASED ON EVALUATION RESULTS, IMAGE PROCESSING APPARATUS, AND METHOD OF CONTROLLING THE SAME

CROSS-REFERENCE TO RELATED APPLICATIONS

This application is a divisional of application Ser. No. 17/151,655, filed Jan. 18, 2021, the entire disclosure of which is hereby incorporated by reference.

BACKGROUND OF THE INVENTION

Field of the Invention

The present invention relates to an information processing apparatus, an image processing apparatus, and a method of controlling the same.

Description of the Related Art

Image capture apparatuses such as digital cameras and digital video cameras have hardware and software that execute various types of image processing to convert image data (RAW data) read from an image sensor into image data in a generic format such as JPEG, MPEG, etc., that can be used in other devices.

With the exception of updates for bug fixes, the software included in an image capture apparatus basically stay the same as when the apparatus was first sold, and the apparatus typically cannot use functions which are provided in newer models sold at a later date. This is because, for example, the hardware of older models does not meet the specifications required to implement the functions provided in newer models.

Meanwhile, any smartphone, tablet computer, or the like which has imported image data from an image capture apparatus can utilize functions developed at a later date by uploading an application. However, for functions that are very computationally advanced or computationally intensive, the provided hardware may not be capable of handling those functions, making the functions unusable even by a smartphone, a tablet computer, or the like.

The same problem therefore arises not only in digital cameras, digital video cameras, and the like, but also in all information processing apparatuses, including smartphones, tablet computers, and the like.

Japanese Patent Laid-Open No. 2003-259281 discloses a configuration in which a RAW data processing program is output along with RAW format image data, and image processing is executed by an external apparatus. According to this configuration, image processing which requires a higher level of performance than the information processing apparatus is capable of providing can be applied to RAW data as well.

However, the size of RAW data is extremely large. Furthermore, processing programs also transmit data to external apparatuses, and thus the configuration described in Japanese Patent Laid-Open No. 2003-259281 also takes time for data transmission. There is an additional problem in that when the data transmission costs money, the communication costs will rise. This problem becomes particularly serious when transmitting all of the RAW data which has been captured to the external apparatus.

SUMMARY OF THE INVENTION

The present invention has been conceived to alleviate at least these problems with the past techniques.

One aspect of the present invention provides an information processing apparatus that enables image processing in an external apparatus to be used efficiently, as well as a method of controlling the information processing apparatus.

Another aspect of the present invention provides an image processing apparatus suitable as an external apparatus for such an information processing apparatus, and a method of controlling the image processing apparatus, as well as an image processing system including the information processing apparatus and the image processing apparatus.

According to an aspect of the present invention, there is provided an information processing apparatus comprising a communication circuit and a control circuit, wherein the control circuit: transmits reduced image data of captured image data, to a first external apparatus through the communication circuit, receives, from the first external apparatus, a result of evaluation processing applied to the reduced image data, on the basis of the result of the evaluation processing, determines whether to apply image processing to the captured image data corresponding to the reduced image data, by a second external apparatus, transmits the captured image data that is determined to be applied the image processing, to the second external apparatus through the communication circuit, and receives, from the second external apparatus, a result of the image processing applied to the captured image data.

According to another aspect of the present invention, there is provided an image processing apparatus comprising a communication circuit and a control circuit, wherein the control circuit: receives reduced image data from an information processing apparatus through the communication circuit, applies evaluation processing to the reduced image data, transmits a result of the evaluation processing to the information processing apparatus through the communication circuit, receives image data having a higher resolution than the reduced image data from the information processing apparatus through the communication circuit, applies predetermined image processing to the image data, and transmits a result of the image processing to the information processing apparatus through the communication circuit.

According to a further aspect of the present invention, there is provided an image processing apparatus comprising a communication circuit and a control circuit, wherein the control circuit: receives reduced image data from an information processing apparatus through the communication circuit, applies evaluation processing to the reduced image data, on the basis of a result of the evaluation processing, requests the information processing apparatus to transmit original image data of the reduced image data, receives the original image data from the information processing apparatus through the communication circuit, applies predetermined image processing to the original image data, and transmits a result of the image processing to the information processing apparatus through the communication circuit.

According to another aspect of the present invention, there is provided an image processing system in which the information processing apparatus according to the present invention and the image processing apparatus according to the present invention are communicatively connected.

According to a further aspect of the present invention, there is provided a control method for an information processing apparatus, the method comprising: transmitting reduced image data of captured image data to a first external apparatus through a communication circuit of the information processing apparatus; receiving, from the first external apparatus, a result of evaluation processing applied to the reduced image data; on the basis of the result of the evaluation processing, determining whether to apply image processing to the captured image data corresponding to the reduced image data, by a second external apparatus; transmitting the captured image data that is determined to be applied the image processing, to the second external apparatus through the communication circuit; and receiving, from the second external apparatus, a result of the image processing applied to the captured image data.

According to another aspect of the present invention, there is provided a control method for an image processing apparatus, the method comprising: receiving reduced image data from an information processing apparatus through a communication circuit of the image processing apparatus; applying evaluation processing to the reduced image data; transmitting a result of the evaluation processing to the information processing apparatus through the communication circuit; receiving image data having a higher resolution than the reduced image data from the information processing apparatus through the communication circuit; applying predetermined image processing to the image data; and transmitting a result of applying the image processing to the information processing apparatus through the communication circuit.

According to a further aspect of the present invention, there is provided a control method for an image processing apparatus, the method comprising: receiving reduced image data from an information processing apparatus through a communication circuit of the image processing apparatus; applying evaluation processing to the reduced image data; on the basis of a result of the evaluation processing, requesting the information processing apparatus to transmit original image data of the reduced image data; receiving the original image data from the information processing apparatus through the communication circuit; applying predetermined image processing to the original image data; and transmitting a result of the image processing to the information processing apparatus through the communication circuit.

According to another aspect of the present invention, there is provided an information processing apparatus capable of communicating with a first external apparatus and a second external apparatus, the information processing apparatus comprising: a storage device that stores image data; and a control circuit that controls an operation of the information processing apparatus, wherein the control circuit: transmits, to the first external apparatus, information for selecting image data stored in the storage device, receives, from the first external apparatus, information about selected image data, transmits the selected image data to the second external apparatus, and receives, from the second external apparatus, a result of image processing applied to the image data that has been transmitted.

According to a further aspect of the present invention, there is provided an information processing apparatus capable of communicating with a first external apparatus and a second external apparatus, the information processing apparatus comprising: a storage device that stores image data; and a control circuit that controls an operation of the information processing apparatus, wherein the control circuit: transmits, to the first external apparatus, information for selecting image data stored in the storage device, receives information that identifies selected image data and a partial region of the selected image data, from the first external apparatus, as information about the selected image data, transmits data of the partial region of the selected image data to the second external apparatus, transmits, to the second external apparatus, image data, among the selected image data, for which a request has been made by the first external apparatus, and receives, from the second external apparatus, a result of image processing applied to the image data requested by the first external apparatus.

According to another aspect of the present invention, there is provided an image processing apparatus comprising a control circuit, wherein the control circuit: receives information pertaining to image data stored in an information processing apparatus from the information processing apparatus, displays, on the basis of the information, a screen for selecting image data stored in the information processing apparatus, determines a partial region of the image data selected through the screen, and transmits, to the information processing apparatus, information pertaining to the selected image data and the partial region.

According to a further aspect of the present invention, there is provided an image processing apparatus comprising a control circuit, wherein the control circuit: receives proxy image data based on image data stored in an information processing apparatus from the information processing apparatus, calculates an evaluation value for the proxy image data, generates, on the basis of the evaluation value, information indicating a priority order of the proxy image data, and transmits, to the information processing apparatus, information indicating the priority order.

According to an aspect of the present invention, there is provided a non-transitory computer-readable medium storing a program for causing a computer to function as the information processing apparatus according to the present invention.

According to a further aspect of the present invention, there is provided a non-transitory computer-readable medium storing a program for causing a computer to function as the image processing apparatus according to the present invention.

According to another aspect of the present invention, there is provided a control method for an information processing apparatus, the information processing apparatus including a storage device which stores image data and being capable of communicating with a first external apparatus and a second external apparatus, the method comprising: transmitting, to the first external apparatus, information for selecting image data stored in the storage device; receiving, from the first external apparatus, information about selected image data; transmitting the selected image data to the second external apparatus; and receiving, from the second external apparatus, a result of image processing applied to the image data that has been transmitted.

According to a further aspect of the present invention, there is provided a control method for an information processing apparatus, the information processing apparatus including a storage device which stores image data and being capable of communicating with a first external apparatus and a second external apparatus, the method comprising: transmitting, to the first external apparatus, information for selecting image data stored in the storage device; receiving information that identifies selected image data and a partial region of the selected image data, from the first external apparatus, as information about the selected image data; transmitting data of the partial region of the selected image data to the second external apparatus; transmitting, to the second external apparatus, image data, among the selected image data, for which a request has been made by the first external apparatus; and receiving, from the second external apparatus, a result of image processing applied to the image data requested by the first external apparatus.

According to another aspect of the present invention, there is provided a control method for an image processing apparatus, the method comprising: receiving information pertaining to image data stored in an information processing apparatus from the information processing apparatus; displaying, on the basis of the information, a screen for selecting image data stored in the information processing apparatus; determining a partial region of the image data selected through the screen; and transmitting, to the information processing apparatus, information pertaining to the selected image data and the partial region.

According to a further aspect of the present invention, there is provided a control method for an image processing apparatus, the method comprising: receiving proxy image data based on image data stored in an information processing apparatus from the information processing apparatus; calculating an evaluation value for the proxy image data; generating, on the basis of the evaluation value, information indicating a priority order of the proxy image data; and transmitting, to the information processing apparatus, information indicating the priority order.

Further features of the present invention will become apparent from the following description of exemplary embodiments (with reference to the attached drawings).

BRIEF DESCRIPTION OF THE DRAWINGS

FIG. 2 is a flowchart pertaining to a first embodiment.

FIGS. 5A and 5B are diagrams pertaining to an image processing system and an edge device according to second to fifth embodiments.

FIG. 9 is a flowchart pertaining to the third and fourth embodiments.

FIGS. 11A and 11B are diagrams illustrating the third and fourth embodiments.

FIG. 12 is a diagram pertaining to a server according to the fourth embodiment.

FIG. 13 is a flowchart pertaining to the fourth embodiment.

FIG. 14 is a flowchart pertaining to the fifth embodiment.

FIGS. 19A and 19B are flowcharts pertaining to a seventh embodiment.

DESCRIPTION OF THE EMBODIMENTS

Figure 1A:
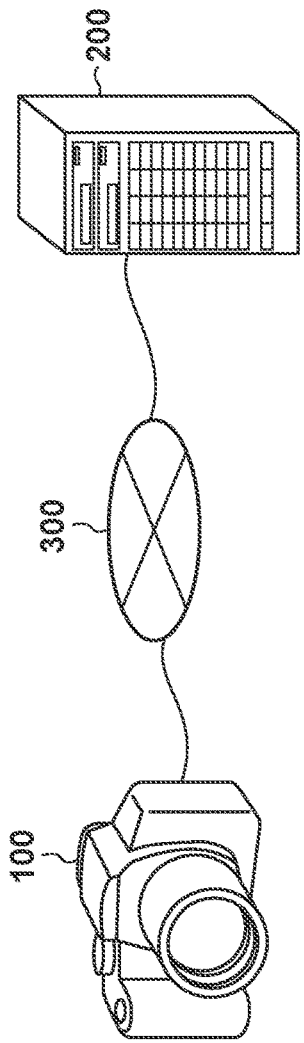
FIGS. 1A to 1C are diagrams illustrating an image processing system, an information processing apparatus, and a server according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following embodiments will describe a case where the present invention is applied in an image capture apparatus, which is an example of an information processing apparatus. However, the present invention can be applied in any electronic device capable of handling image data. Examples of such an electronic device include video cameras, computer devices (personal computers, tablet computers, media players, PDAs, and the like), mobile phones, smartphones, game consoles, robots, drones, and dashboard cameras. These are merely examples, however, and the present invention can be applied in other electronic devices as well.

First Embodiment

FIG. 1A is a diagram schematically illustrating an example of the configuration of an image processing system according to a first embodiment of the present invention. The image processing system has a configuration in which an image capture apparatus 100 and a server apparatus 200 serving as an external apparatus (first and second external apparatuses) are communicatively connected over a network 300. Note that the image capture apparatus 100 may be connected to a plurality of networks 300. The image capture apparatus 100 and the server apparatus 200 can communicate with each other using a communication protocol based on the type of the network 300. For example, if the network 300 is the Internet, the apparatuses can communicate using the TCP/IP, UDP, or similar protocols. Here, it is assumed that the network 300 is a public network such as the Internet, or a network for which usage or communication amounts are charged, for example.

Figure 1B:
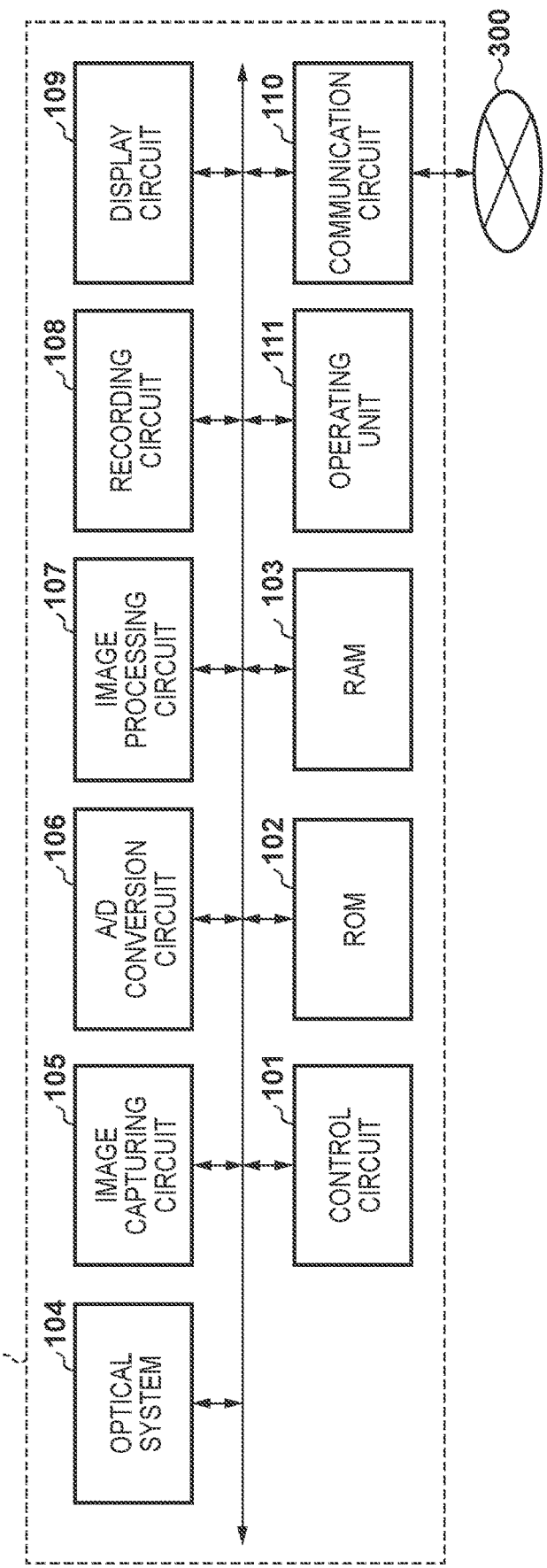

FIG. 1B is a block diagram illustrating an example of the functional configuration of the image capture apparatus 100. Typically, the image capture apparatus 100 is a digital (video) camera, but may be any electronic device that has an image capture function and is capable of communicating with the server apparatus 200 (also called simply the "server 200" hereinafter) over the network 300.

A control circuit 101 is, for example, a CPU (also called an "MPU" or a "microprocessor"), and implements various functions of the image capture apparatus 100 by loading programs stored in ROM 102 into RAM 103, executing the programs, and controlling the operations of the respective elements of the image capture apparatus 100. Note that when an optical system 104 is an interchangeable type, the control circuit 101 controls operations of the optical system 104 by communicating with a controller of the optical system 104.

The ROM 102 stores programs executed by the control circuit 101, various types of setting values and GUI data of the image capture apparatus 100, and the like. The ROM 102 may be electrically rewriteable. The RAM 103 is main memory used when the control circuit 101 executes programs. The RAM 103 may also be used as buffer memory for image data, video memory for a display circuit 109, and the like.

The optical system 104 includes mobile lenses such as a zoom lens and a focus lens, and forms a subject image on an image capturing surface of an image capturing circuit 105. The control circuit 101 controls driving of the mobile lenses of the optical system 104.

The image capturing circuit 105 is an image sensor such as a CCD image sensor, a CMOS image sensor, or the like, for example. A plurality of photoelectric conversion circuits are arranged two-dimensionally in the image sensor, and the subject image formed on the image capturing surface of the optical system 104 is converted into an analog image signal by the photoelectric conversion circuits. An A/D conversion circuit 106 converts the analog image signal input from the image capturing circuit 105 into digital image data. Note that the A/D conversion circuit 106 may be included in the image capturing circuit 105.

The digital image data is temporarily stored in the RAM 103. An image processing circuit 107 generates signals and image data, obtains and/or generates various types of information, and so on by applying predetermined image processing to the image data stored in the RAM 103. The image processing circuit 107 may, for example, be a dedicated hardware circuit, such as an ASIC, designed to implement specific functions, or may be realized by a programmable processor, such as a DSP, which is configured to implement specific functions by executing software.

Here, the image processing applied by the image processing circuit 107 includes preprocessing, color interpolation processing, correction processing, detection processing, data processing, evaluation value calculation processing, special effect processing, and so on.

The pre-processing includes signal amplification, reference level adjustment, missing pixel correction, and the like. The color interpolation processing is processing for interpolating the values of color components not included in the image data read out from the pixels, and is also called "demosaicing" or "synchronization".

The correction processing includes white balance adjustment, tone correction (gamma processing), processing for correcting the effects of optical aberration, vignetting, and so on of the optical system 104, color correction processing, and so on.

The detection processing includes detecting a feature region (e.g., a facial region or a human body region) or movement in such a region, processing for recognizing a person, or the like.

The data processing includes compositing processing, scaling processing, encoding and decoding processing, header information generation processing, and the like.

The evaluation value calculation processing includes generating signals, evaluation values, and the like used in automatic focus detection (AF), processing for calculating evaluation values used in automatic exposure control (AE), and the like.

The special effect processing includes adding blur, changing color tones, relighting processing, and the like.

Note that these are merely examples of the image processing that can be applied by the image processing circuit 107, and the image processing applied by the image processing circuit 107 is not limited thereto.

Pixel data constituting the digital image data supplied from the A/D conversion circuit 106 to the image processing circuit 107 in the above-described image processing has a single color component value based on a color arrangement in color filters of the image sensor. Such image data is called "RAW data". Of the image processing applied to the RAW data by the image processing circuit 107, a series of image processing for converting the RAW data into image data of a generic format which can be used to display or print photographic data is called "development processing". The development processing typically includes white balance processing and color interpolation processing, and can also include lens aberration correction processing, noise reduction (NR) processing, gamma (tone conversion) processing, and the like.

A recording circuit 108 records data of captured images into a recording medium, reads out data of captured images recorded in the recording medium, and so on. The recording medium may be a removable memory card, for example. The recording circuit 108 records, into the recording medium, captured image data for recording (moving image or still image data) and/or RAW data, stored in the RAM 103 and to which the development processing has been applied by the image processing circuit 107, as well as proxy image data.

The proxy image data is image data having a lower data amount than the captured image data for recording and the RAW data, and for a still image, may be a thumbnail image. The thumbnail image is a reduced-size image of the original image after the development processing, and the thumbnail image data is reduced image data. The proxy image data may be image data that, for example, has a lower resolution, and/or a lower bit depth, than the captured image data for recording and the RAW data. For still images, the proxy image data may be, for example, image data (thumbnail image data) which has been subjected to the development processing (developed), and that has a lower resolution than the RAW data. For moving images, the proxy image data may be, for example, developed moving image data having a lower bitrate than the RAW data. Note that although the proxy image data does not absolutely have to be developed, using developed data makes it possible to reduce the data amount.

The display circuit 109 is a display device such as an LCD, and performs displays corresponding to the image data stored in a video memory region of the RAM 103. The display circuit 109 displays captured images, information obtained from captured images (e.g., a luminance histogram), setting values of the image capture apparatus 100, and GUI elements (icons, marks, and the like overlaid on menu screens, captured images, and the like).

A communication circuit 110 includes a communication interface compliant with one or more publicly known wireless or wired communication standards, for example, and implements data communication between an external device and the image capture apparatus 100. The communication circuit 110 can support data communication using a mobile phone network compliant with standards such as LTE and 5G, data communication compliant with standards such as wireless LAN and Bluetooth (registered trademark), and the like. The communication circuit 110 can also support communication standards such as USB, Ethernet (registered trademark), and the like. In the present embodiment, the communication circuit 110 implements communication between the image capture apparatus 100 and the server 200 over the network 300. The control circuit 101 exchanges image data and the like with the server 200 through the communication circuit 110.

An operating unit 111 includes input devices, such as buttons and switches, with which a user inputs various types of instructions to the image capture apparatus 100. If the display circuit 109 is a touch screen, the touch panel is also included in the input devices. The input devices constituting the operating unit 111 are named according to the functions assigned thereto. For example, the operating unit 111 includes a release switch for instructing the start of shooting preparation operations and the start of shooting, a shooting mode selection switch for selecting a shooting mode, a menu button, a directional key, an OK key, and the like. A plurality of functions may be assigned to the same input device. Additionally, the input device may include a software button/key. Input devices through which instructions are input in a non-contact manner, such as voice input or gaze-directed input, may also be included in the operating unit 111.

Figure 1C:
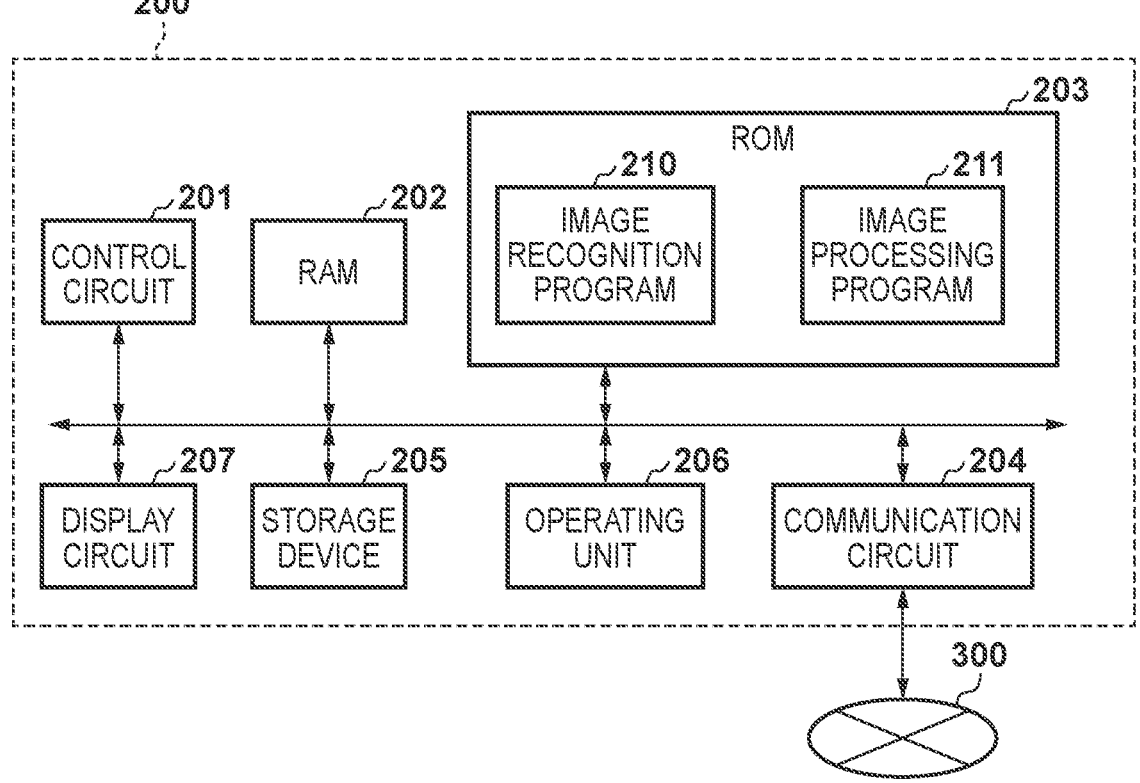

FIG. 1C is a block diagram illustrating an example of the functional configuration of the server 200. Although typically a generic computer located on a network, the server 200 may be any electronic device that has server functionality and is capable of communicating with the image capture apparatus 100 over the network 300.

A control circuit 201 is, for example, a CPU (also called an "MPU" or a "microprocessor"), and implements various server functions by loading programs stored in ROM 203 or a storage device 205 into RAM 202 and executing the programs. Note that an auxiliary processor suited to the execution of image processing, such as a GPU, may be used in the server 200 in addition to the CPU. The ROM 203 stores application programs for implementing image processing functions provided by the server 200, programs executed during startup, various types of setting values, and the like.

Here, as examples of the application programs for implementing the image processing functions, an image recognition program 210 and an image processing program 211 are stored in the ROM 203. The image processing functions provided by the server 200 are typically functions which cannot be applied by the image capture apparatus 100, or are superior to functions provided by the image capture apparatus 100 in terms of at least one of processing time and processing quality. The server 200 can, as needed, obtain a program based on the latest image processing technology from another device capable of communicating over the network 300, through, for example, a communication circuit 204. This makes it possible to more easily reap the benefits of technological progress than with the image capture apparatus 100, for which the software cannot be updated easily. For example, image recognition programs using machine learning techniques such as deep learning, which are being put into practical use at a dramatic rate in recent years, can be used with ease.

The RAM 202 is main memory used when the control circuit 201 executes programs. The RAM 202 may also be used as buffer memory for image data, video memory for a display circuit 207, and the like.

The communication circuit 204 includes a communication interface compliant with one or more publicly known wireless or wired communication standards, for example, and implements data communication between an external device and the server 200. In the present embodiment, the communication circuit 204 implements communication between the server 200 and the image capture apparatus 100 over the network 300. The control circuit 201 exchanges image data and the like with the image capture apparatus 100 through the communication circuit 204.

The storage device 205 may be a large-capacity storage device such as a hard disk drive (HDD), a solid-state drive (SSD), or the like. The storage device 205 is used to store, for example, an OS, application programs, user data, and the like. The ROM 203 may be part of the storage device 205.

An operating unit 206 includes input devices with which a user inputs instructions to the server 200, and is typically a keyboard, a mouse, a touch pad, or the like.

The display circuit 207 is a display device such as an LCD, and performs displays corresponding to the image data stored in a video memory region of the RAM 202. The display circuit 207 displays user interface elements provided by the OS, information pertaining to applications, and the like.

Note that the network 300 may have any configuration capable of supporting data communication between the image capture apparatus 100 and the server 200, and because any configuration can be used, detailed descriptions thereof will not be given.

Interactive operations between the image capture apparatus 100 and the server 200 will be described next with reference to the flowchart in FIG. 2. In the following, the control circuit 101 (CPU) is the main entity actually performing operations described as being executed by the image capture apparatus 100, and the control circuit 201 (CPU) is the main entity actually performing operations described as being executed by the server 200. Additionally, in the image capture apparatus 100, when generating image data for recording from image data obtained from shooting, the image processing circuit 107 also generates the corresponding proxy image data. It is further assumed that the image data for recording and proxy image data are recorded in association with each other by the recording circuit 108.

In step S401, the image capture apparatus 100 transmits the proxy image data recorded by the recording circuit 108 from the communication circuit 110 to the server 200 over the network 300. It is assumed that settings, information, and the like necessary for communication with the server 200 are registered in advance and stored in the ROM 102. The timing at which step S401 is executed is not particularly limited. For example, the step may be started upon confirmation that unprocessed RAW data is present in the recording circuit 108, or may be started in response to a user instruction. The transmitted proxy image data may be data which corresponds to the RAW data, data which corresponds to developed image data, or data selected by the user. Alternatively, all of the proxy image data may be transmitted.

Furthermore, proxy image data corresponding to RAW data which has not been subjected to the development processing (unprocessed RAW data) may be transmitted. This makes it possible, for example, to distinguish RAW data for which corresponding image data in a generic format (e.g., the JPEG format) is not recorded as unprocessed RAW data. Alternatively, a filename that makes it possible to distinguish whether or not the RAW data is unprocessed may be added, and the unprocessed RAW data may be determined from the filename.

In step S402, the server 200 receives the proxy image data from the image capture apparatus 100 through the communication circuit 204. The server 200 stores the received proxy image data in the RAM 202.

In step S403, the server 200 loads the image recognition program 210 stored in the ROM 203 into the RAM 202 and executes the program. The image recognition program 210 provides a function for detecting a facial region by applying publicly known facial recognition processing to the image data, and a subject recognition function for recognizing a person in the detected facial region by comparing features of the detected facial region with features of facial regions of people registered in advance. By executing the image recognition program 210, the control circuit 201 applies, to the proxy image data, evaluation processing that generates information serving as a determination standard for the image capture apparatus 100 to determine image data to which image processing is to be applied by the external apparatus. Subject recognition processing is an example of the evaluation processing, and other information may be generated on the basis of the proxy image data.

Figure 3:
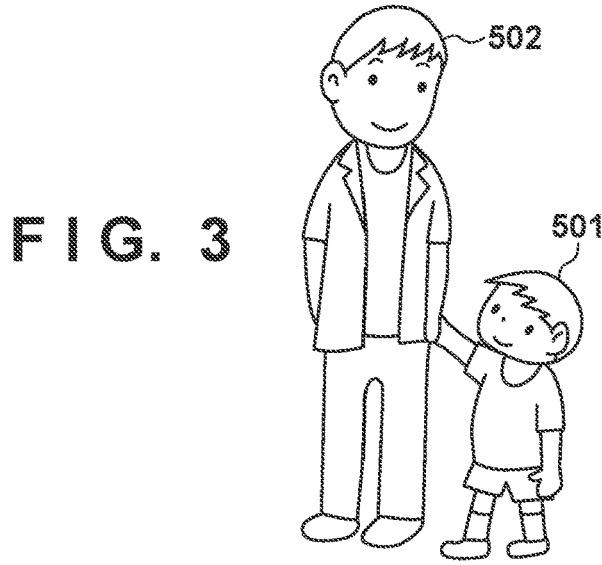
FIG. 3 is a diagram illustrating the first embodiment.

It is assumed that the facial region of a person to be detected, or feature information thereof, is registered in the server 200 in advance. This registration can be implemented by, for example, transmitting data of an image showing the face of the person to be detected from the image capture apparatus 100 to the server 200, and the server 200 registering feature information extracted from the facial region using the image recognition program 210. Note that the person to be detected may be registered through a different method instead. Here, it is assumed that a person 501 and a person 502 are registered as people to be detected using an image such as that illustrated in FIG. 3. The server 200 adds unique identification information (ID) to the feature information of each person to be detected and stores that information in the storage device 205, for example. It is assumed here that "ID1" is assigned to the person 501 and "ID2" is assigned to the person 502.

Figure 4:
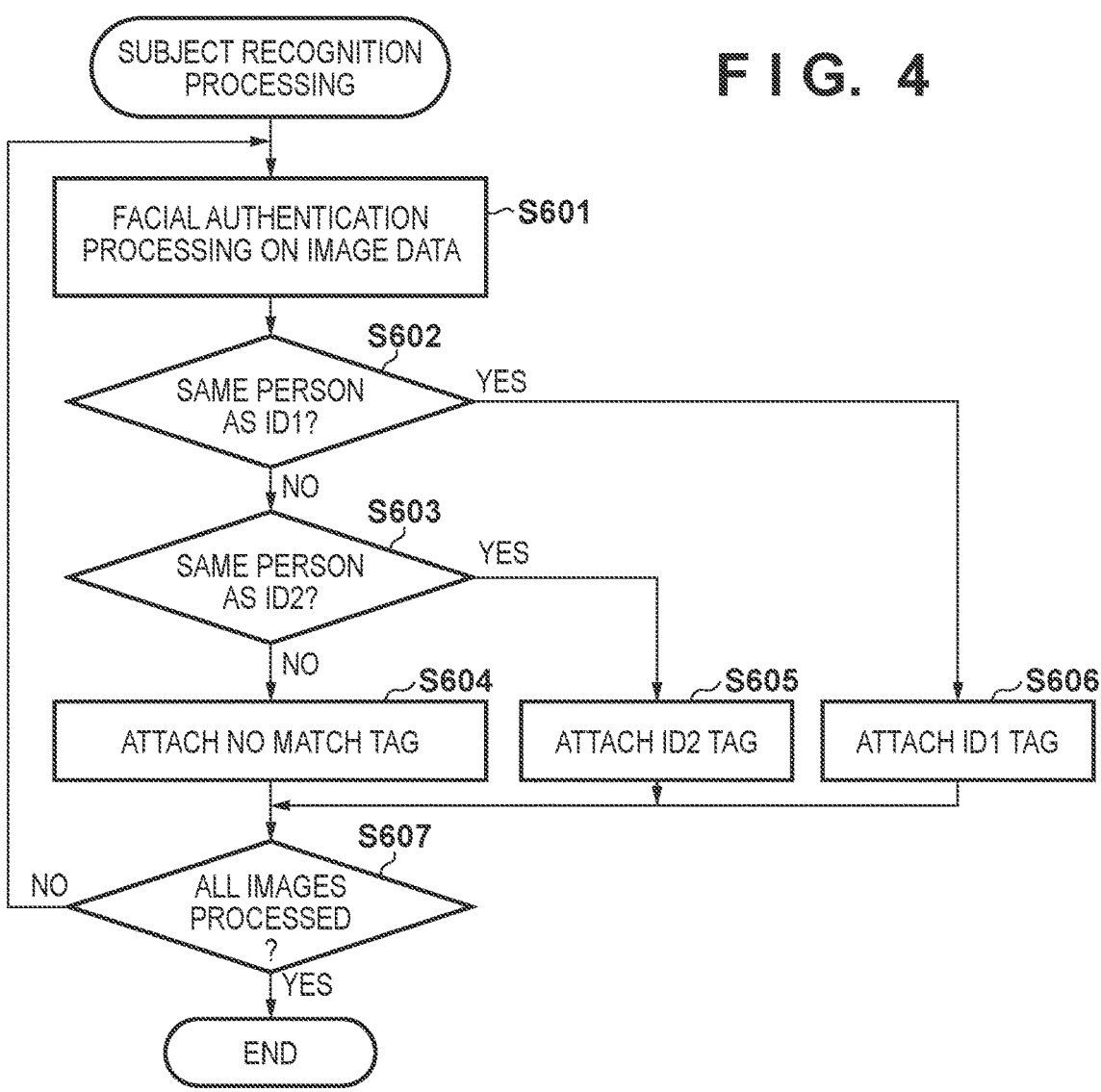
FIG. 4 is a flowchart pertaining to the first embodiment.

The subject recognition processing performed in step S403 will be described in detail with reference to the flowchart in FIG. 4. This processing is implemented by the control circuit 201 (CPU) executing the image recognition program 210.

In step S601, the control circuit 201 applies facial authentication processing to one of the instances of proxy image data stored in the RAM 202. The facial authentication processing is processing for detecting a facial region from the proxy image data and processing for determining whether or not the detected facial region is that of a registered person. If a feature of the detected facial region is determined to be identical or highly similar to a feature of a registered person, the control circuit 201 can determine that the detected facial region is the facial region of a registered person. Note that when a plurality of facial regions are detected from the proxy image data, the control circuit 201 determines whether or not each of the detected facial regions are facial regions of a registered person.

In steps S602 to S603 and S605 to S606, the control circuit 201 adds a tag to the proxy image data on the basis of the result of the facial authentication processing performed in step S601.

In step S602, the control circuit 201 determines whether the facial authentication processing performed in step S601 indicates that the facial region detected from the proxy image data is a facial region of a person registered as "ID1". If so, the sequence moves to step S606, and if not, the sequence moves to step S603.

In step S603, the control circuit 201 determines whether the facial authentication processing performed in step S601 indicates that the facial region detected from the proxy image data is a facial region of a person registered as "ID2". If so, the sequence moves to step S605, and if not, the sequence moves to step S604.

In step S605, the control circuit 201 adds a tag of "ID2" to the proxy image data. In step S606, the control circuit 201 adds a tag of "ID1" to the proxy image data. Note that when a plurality of facial regions have been detected from the proxy image data, the control circuit 201 executes steps S602 and S603 for each of the facial regions.

In step S604, the control circuit 201 adds, to the proxy image data, a tag indicating that it has been determined that no registered person appears in the image (a "no match" tag).

In step S607, the control circuit 201 determines whether the subject recognition processing has been applied to all of the received proxy image data. If so, the subject recognition processing ends, and if not, the processing from step S601 is applied to the proxy image data to which the subject recognition processing has not yet been applied.

Although an example in which there are two registered people, having the ID1 and ID2, has been described here, the control circuit 201 performs the same tagging processing regardless of the number of registered people. In this manner, through the subject recognition processing, a tag for the ID of a registered person determined to be present in the proxy image, or a tag indicating that no registered person is present, is added to the proxy image data received from the image capture apparatus 100.

Returning to FIG. 2, in step S404, the server 200 transmits information of the tags added in step S403 (a subject recognition result) to the image capture apparatus 100 over the network 300. The server 200 transmits, for example, data in which information specifying the proxy image data and information of the tags added to that proxy image data are associated with each other as tag information. Not transmitting the proxy image data makes it possible to reduce the amount of transmitted data and cut down on processing delay. The tag information may be information indicating, for example, one or more person IDs, or no match.

In step S405, the image capture apparatus 100 receives the tag information from the server 200 and stores that information in the RAM 103.

In step S406, the image capture apparatus 100 determines the image data to which image processing is to be applied by the server 200 (here, the RAW data) on the basis of the received tag information for the people. Here, for example, it is assumed that the original data of a proxy image associated with one or more person IDs is determined to be the image data to which the image processing is to be applied by the server 200. Note that the "original data of a proxy image" is the image data serving as the basis of the proxy image, and may be RAW data or developed image data.

In this case, in step S406, the image capture apparatus 100 determines, for one instance of the proxy image data transmitted in step S401, whether or not one or more person IDs are associated with the tag information received from the server 200. If it is determined that one or more person IDs are associated, the image capture apparatus 100 determines that the corresponding RAW data is RAW data to which the image processing is to be applied by the server 200, and executes step S407. On the other hand, if it is not determined that one or more person IDs are associated, the image capture apparatus 100 executes step S413 without executing step S407.

In step S407, the image capture apparatus 100 transmits the RAW data to the server 200 and stands by to receive a developing result.

In step S408, upon receiving the RAW data from the image capture apparatus 100, the server 200 stores the RAW data in the RAM 202, the storage device 205, or the like.

In step S409, the server 200 loads the image processing program 211 from the ROM 203 into the RAM 202 and executes the program. The image processing program 211 applies the development processing to the RAW data. The development processing includes, for example, white balance processing, lens aberration correction, noise reduction (NR) processing, color interpolation processing, gamma processing, and the like. Additionally, an image data file in a predetermined format such as the JPEG format may be generated by applying encoding processing after the development processing.

The development processing applied by the server 200 is processing based on a newer and/or more complex method than the processing performed by the image processing circuit 107 of the image capture apparatus 100, and can therefore achieve a better processing result than development processing applied by the image capture apparatus 100. This is due to the processing capabilities of the server 200 being higher than the processing capabilities of the image capture apparatus 100, and the image processing program 211 executed by the server 200 being based on newer technology than the image processing circuit 107 of the image capture apparatus 100.

In step S410, the server 200 transmits the image data, to which the development processing has been applied in step S409, to the image capture apparatus 100 over the network 300.

In step S411, the image capture apparatus 100 receives the post-development processing image data from the server 200.

In step S412, the image capture apparatus 100 supplies the post-development processing image data to the image processing circuit 107, and causes image data for recording and image data for display to be generated. The image capture apparatus 100 then causes the display circuit 109 to display the image data for display, and causes the recording circuit 108 to record the image data for recording.

In step S413, the image capture apparatus 100 determines whether or not all of the proxy image data transmitted in step S401 has been processed, and if it is determined that all of the proxy image data has been processed, the RAW data development processing ends. On the other hand, if it is not determined that all of the proxy image data has been processed, the processing from step S406 is applied to the unprocessed proxy image data.

The image capture apparatus according to the present embodiment determines, on the basis of a result of applying predetermined image processing to the proxy image data of recorded image data using an external apparatus, whether or not to execute image processing on the original data of the proxy image data using the external apparatus. Accordingly, whether or not the image processing should be applied using the external apparatus can be determined on the basis of a result of image processing which cannot be applied, or can only be applied with a lower level of accuracy, using the image capture apparatus.

For example, when the image capture apparatus cannot apply accurate subject recognition processing, using a result of the external apparatus applying accurate subject recognition processing to the proxy image data makes it possible to more accurately determine image data that should be processed by the external apparatus. The present embodiment has described an example of using a result of determining whether or not a registered person is present using an external apparatus. However, a result of other image processing can also be used, e.g., a result of recognition processing for recognizing a subject aside from a person, scene determination processing, and so on.

The present embodiment has described a configuration in which the user cannot be involved in the determination, made by the image capture apparatus 100, that image data should be processed by the external apparatus. However, the configuration may be such that a list of image data determined to be processed by the external apparatus is displayed in a selectable manner in the display circuit 109, and only image data selected by the user from the list is transmitted to the external apparatus. Additionally, the image processing ultimately applied by the external apparatus is not limited to RAW data development processing, and may be any image processing. Furthermore, the image data to which the external apparatus applies the image processing is not limited to RAW data, and may be developed image data for recording.

Second Embodiment

A second embodiment of the present invention will be described next. FIG. 5A is a diagram schematically illustrating an example of the configuration of an image processing system according to the present embodiment. Constituent elements which are the same as in the first embodiment will be given the same reference numerals as in FIG. 1A, and will not be described. In the present embodiment, the image processing performed on the proxy image data is performed by an edge device 400, which is an external apparatus positioned before the network 300 with respect to the image capture apparatus 100, rather than being performed by the server 200 on the network 300. Accordingly, in the present embodiment, the edge device 400 is a first external apparatus and the server 200 is a second external apparatus.

The edge device 400 is an image processing apparatus that is capable of communicating with the image capture apparatus 100, and is also capable of communicating with the server 200 over the network 300. Here, a configuration in which a computer device having a communication function, such as a smartphone or a tablet computer, is used as the edge device 400 will be described as an example. Note that when a smartphone is used instead of the image capture apparatus 100, it is conceivable to use, for example, a desktop computer that is more powerful than a smartphone as the edge device 400.

In recent years, more and more smartphones and tablet computers are being equipped with processors for executing high-speed image processing using machine learning technology. Such devices are therefore suited to use as edge devices. Note that the same kind of generic computer as the server 200 may be used as the edge device 400.

The method of communication between the image capture apparatus 100 and the edge device 400 is not particularly limited, and may be wired communication or wireless communication. The image capture apparatus 100 may use the same or different communication methods for communication with the server 200 and the edge device 400. When different communication methods are used, the communication circuit 110 has a communication interface corresponding to each of the communication methods (see FIG. 15). A plurality of communication circuits 110 may be provided in accordance with the communication methods. Here, it is assumed that the communication between the image capture apparatus 100 and the edge device 400 is charged.

FIG. 5B is a block diagram illustrating an example of the functional configuration of the edge device 400. A control circuit 401 is, for example, a CPU (also called an "MPU" or a "microprocessor"), and implements various functions of the edge device 400 by loading programs stored in ROM 402 or a recording circuit 407 into RAM 403 and executing the programs.

The ROM 402 stores programs executed by the control circuit 401, various types of setting values and GUI data of the edge device 400, and the like. The ROM 402 may be electrically rewriteable. The RAM 403 is main memory used when the control circuit 401 executes programs. The RAM 403 may also be used as buffer memory for data, video memory for a display circuit 408, and the like.

An image recognition circuit 404 executes subject recognition processing for determining whether or not a person, registered in advance, is present in an image. The subject recognition processing performed by the image recognition circuit 404 may be the same subject recognition processing as that executed by the server 200 in the first embodiment.

An image processing circuit 405 generates signals and image data, obtains and/or generates various types of information, and so on by applying predetermined image processing to the image data stored in the RAM 403. The image processing that can be applied by the image processing circuit 405 may be the same as the image processing applied by the image processing circuit 107 of the image capture apparatus 100, the image processing applied by the server 200 using the image processing program 211, and so on.

An operating unit 406 includes input devices with which a user inputs instructions to the edge device 400, and is typically a keyboard, a mouse, a touch pad, or the like. When the display circuit 408 is a touch screen, the touch panel provided in the touch screen is included in the operating unit 406.

The recording circuit 407 records data into a recording medium, reads out data recorded in the recording medium, and so on. The recording medium may be a removable memory card, or may be a built-in storage device, for example.

The display circuit 408 is a display device such as an LCD, and performs displays corresponding to the image data stored in a video memory region of the RAM 403. The display circuit 408 displays data stored in the recording circuit 407, GUI elements of applications and an OS, and the like.

The edge device 400 according to the present embodiment includes two communication circuits 409 and 410. It is assumed here that the communication circuit 410 is used in communication with an external device on the network 300 (e.g., the server 200) and the communication circuit 409 is used in communication with the image capture apparatus 100. Note that a single communication circuit that supports a plurality of communication methods may be provided. Alternatively, the communication with both the external device on the network 300 and the image capture apparatus 100 may be carried out using only one of the communication circuits 409 and 410.

Figure 6:
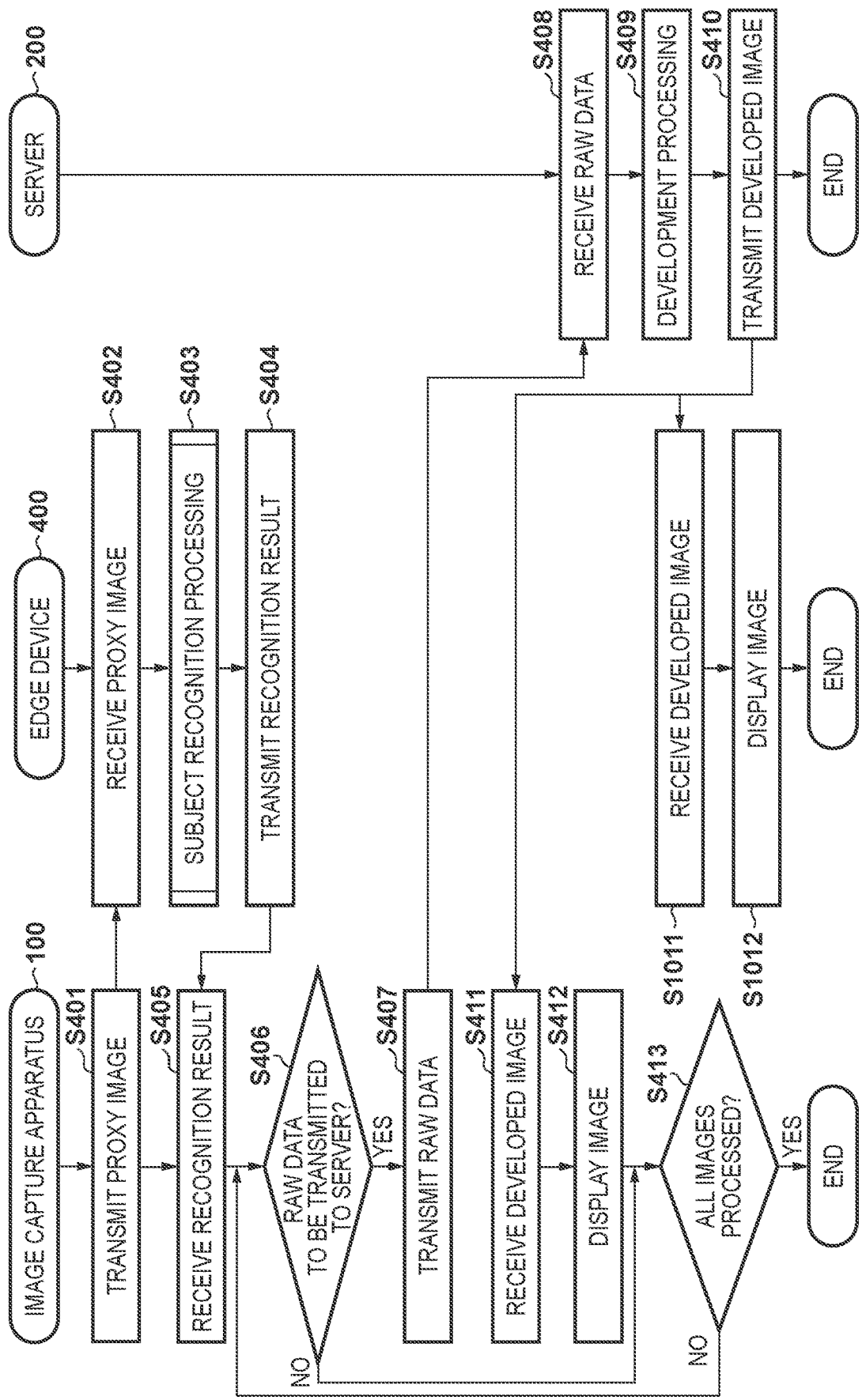
FIG. 6 is a flowchart pertaining to the second embodiment.

Interactive operations between the image capture apparatus 100, the edge device 400, and the server 200 will be described next with reference to the flowchart in FIG. 6. In the following, the control circuit 101 (CPU) is the main entity actually performing operations described as being executed by the image capture apparatus 100, the control circuit 201 (CPU) is the main entity actually performing operations described as being executed by the server 200, and the control circuit 401 (CPU) is the main entity actually performing operations described as being executed by the edge device 400. In FIG. 6, steps in which the same operations as those described in the first embodiment are performed have been given the same reference numerals as those in FIG. 2. It is assumed that settings, information, and the like necessary for communication with the server 200 and the edge device 400 are registered in advance and stored in the ROM 102. Additionally, if it is necessary to register the edge device 400 as a communication partner prior to communicating with the edge device 400, it is assumed that such registration has already been performed in advance.

Steps S401 and S405 are the same as in the first embodiment, except that the communication partner is the edge device 400 instead of the server 200.

In steps S402 to S404, the edge device 400 executes the same processing as that performed by the server in the first embodiment.

In step S402, the edge device 400 receives the proxy image data from the image capture apparatus 100 through the communication circuit 409. The edge device 400 stores the received proxy image data in the RAM 403.

In step S403, the edge device 400 executes the above-described subject recognition processing on the image data stored in the RAM 403 using the image recognition circuit 404. The method of the subject recognition processing need not be the same as the method used by the server 200.

In step S404, the edge device 400 transmits the tag information (subject recognition result) added in step S403 to the image capture apparatus 100 through the communication circuit 409.

In steps S405 and S406, the image capture apparatus 100 determines the RAW data, among the RAW data corresponding to the proxy image data transmitted in step S401, to which the external apparatus (here, the server 200) is to apply the image processing, in the same manner as in the first embodiment.

Then, in step S407, the image capture apparatus 100 transmits the RAW data which has been determined to the server 200.

The operations of the server 200 in steps S408 to S410 are the same as in the first embodiment.

Note that in step S410, the server 200 may transmit the image data which has been subjected to the development processing to the edge device 400 instead of, or in addition to, transmitting that image data to the image capture apparatus 100 over the network 300. In this case, information necessary for transmitting the data to the edge device 400 (a destination address or the like) is registered in the server 200 in advance, or is communicated to the server 200 when the image capture apparatus 100 transmits the RAW data.

The operations of the image capture apparatus 100 in steps S411 to S413 are the same as in the first embodiment.

When the edge device 400 receives the image data which has been subjected to the development processing from the server 200, in step S1011, the edge device 400 stores the received image data in the RAM 403. Then, in step S1012, the edge device 400 displays the image data stored in the RAM 403 in the display circuit 408, and records the image data into the recording circuit 407.

In the present embodiment, the image processing for the proxy image data is performed by the edge device 400 instead of the server 200. According to the present embodiment, the amount of communication data between the image capture apparatus 100 and the server 200 can be reduced compared to the first embodiment, and thus communication costs can be reduced, the effects of congestion and a drop in quality in the network 300 can be alleviated, and so on, in addition to the effects described in the first embodiment.

As in the first embodiment, the image processing applied to the proxy image data, the image processing applied to the RAW data by the server 200, and the like are merely examples, and may be other kinds of image processing, in the present embodiment as well. Additionally, the image data to which the image processing is ultimately applied by the server 200 is not limited to RAW data, and may be developed image data for recording.

Furthermore, the image capture apparatus 100 may allow the user to confirm the image data determined to be the image data to which the image processing will ultimately be applied by the server 200 before transmitting that image data to the server 200. At this time, the user may change one or more instances of the image data determined by the image capture apparatus.

Third Embodiment

A third embodiment of the present invention will be described next. An image processing system according to the present embodiment differs from the second embodiment in terms of the configuration and operations of the edge device. The descriptions will therefore focus on the differences from the second embodiment.

Figure 7:
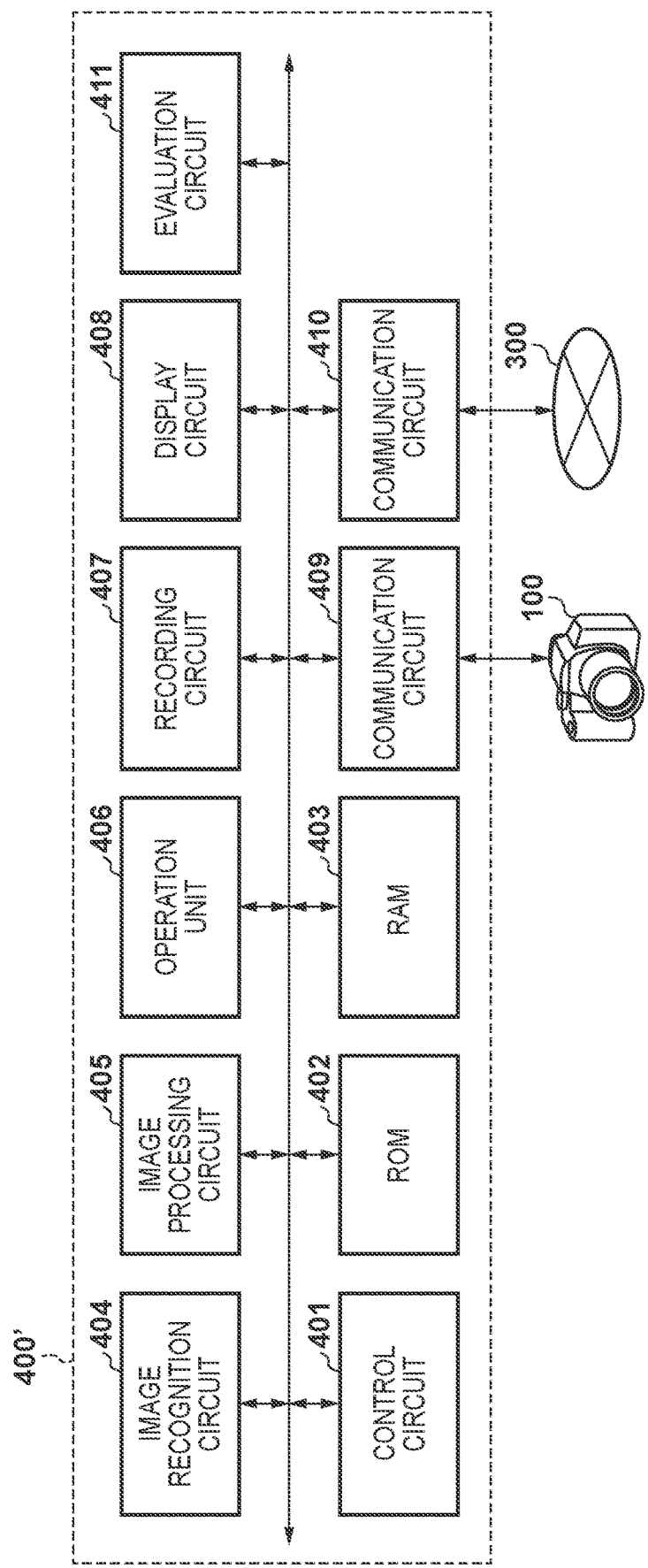
FIG. 7 is a diagram pertaining to an edge device according to the third embodiment.

FIG. 7 is a block diagram illustrating an example of the functional configuration of an edge device 400' according to the present embodiment, obtained by adding an evaluation circuit 411 to the edge device 400 of the second embodiment. The other function blocks are the same as in the second embodiment and will therefore not be described.

In the present embodiment, the image capture apparatus 100 transmits a plurality of frames' worth of RAW data to the edge device 400' rather than the server 200. Then, the edge device 400' selects RAW data on which it is thought that the development processing by the server 200 will have a great effect, and transfers that RAW data to the server 200. The evaluation circuit 411 is an element for determining the RAW data to be transmitted. Although illustrated as an independent constituent element in FIG. 7 for the sake of simplicity, the evaluation circuit 411 may be implemented by the control circuit 401 (CPU) executing an image processing system application stored in the ROM 402.

Figure 8:
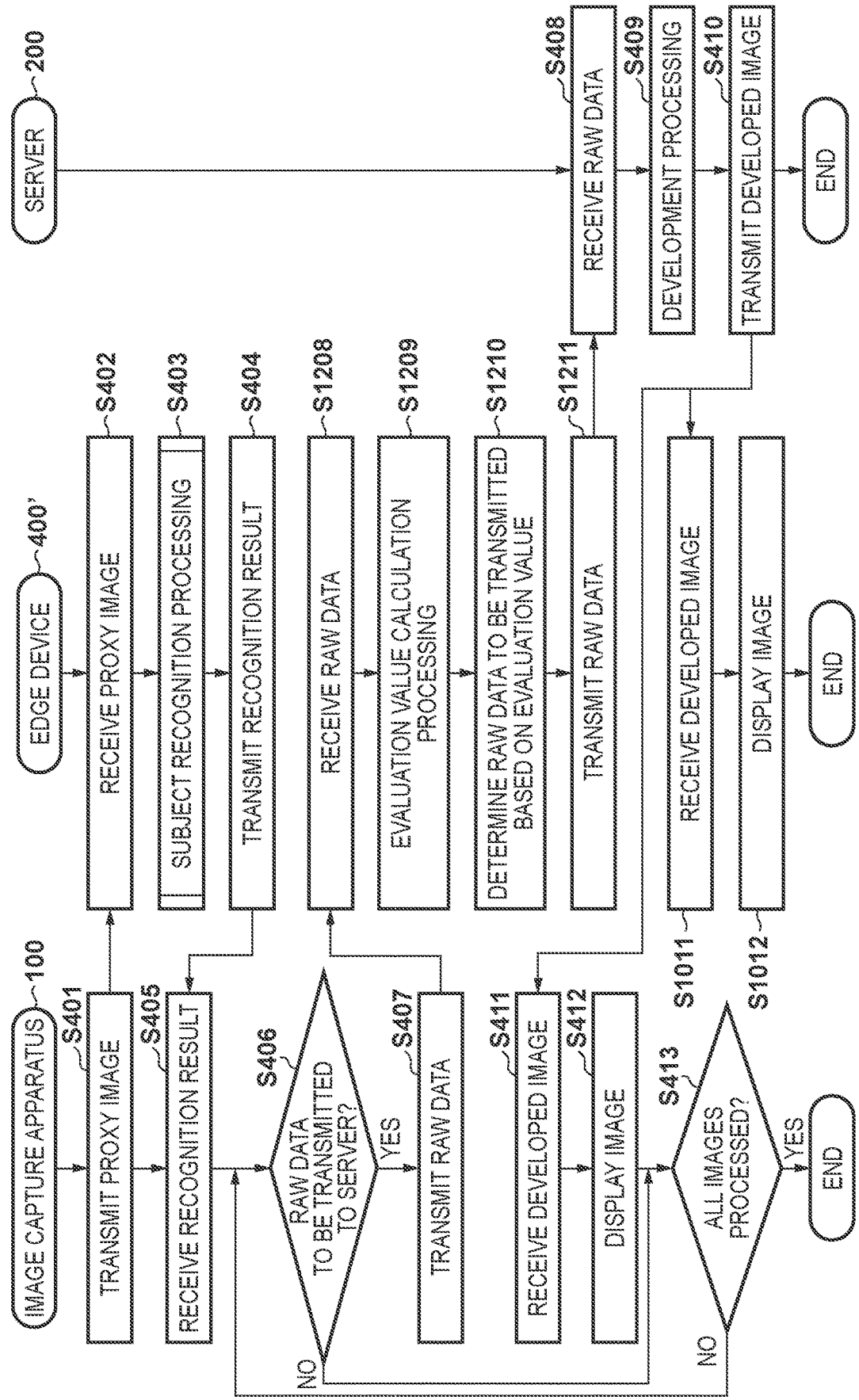
FIG. 8 is a flowchart pertaining to the third embodiment.

Interactive operations between the image capture apparatus 100, the edge device 400', and the server 200 will be described next with reference to the flowchart in FIG. 8. In the following, the control circuit 101 (CPU) is the main entity actually performing operations described as being executed by the image capture apparatus 100, the control circuit 201 (CPU) is the main entity actually performing operations described as being executed by the server 200, and the control circuit 401 (CPU) is the main entity actually performing operations described as being executed by the edge device 400'. In FIG. 8, steps in which the same operations as those described in the first and second embodiments are performed have been given the same reference numerals as those in FIGS. 2 and 6. It is assumed that settings, information, and the like necessary for communication with the server 200 and the edge device 400' are registered in advance and stored in the ROM 102. Additionally, if it is necessary to register the edge device 400' as a communication partner prior to communicating with the edge device 400', it is assumed that such registration has already been performed in advance.

In FIG. 8, the operations of steps S401 to S406 are the same as in the second embodiment and will therefore not be described. In step S407, the image capture apparatus 100 transmits the RAW data to which the image processing is to be applied by the server 200 to the edge device 400'.

In step S1208, the edge device 400' stores the received RAW data in the RAM 403 or the recording circuit 407.

In step S1209, the edge device 400' uses the evaluation circuit 411 to calculate an evaluation value for each instance of the RAW data which has been received.

An example of operations performed by the evaluation circuit 411 to calculate the evaluation value will be described here with reference to the flowchart in FIG. 9. The evaluation circuit 411 calculates an evaluation value serving as an indicator of the magnitude of the effect of the image processing applied by the server 200, for each piece of image data received from the image capture apparatus 100.

A method of calculating the evaluation value in which the effect of the image processing applied by the server 200 is greater for images having a higher number of edges will be described here as an example. Note, however, that the method for calculating the evaluation value is not particularly limited, and can be changed as appropriate by, for example, changing the aforementioned image processing system application. The evaluation value depends on the image processing applied by the server 200, and thus the evaluation value calculated by the evaluation circuit 411 may be changed in accordance with updates made to the image processing program 211 in the server 200, for example.

In step S1601, the evaluation circuit 411 reads out one frame's worth of the RAW data and generates a luminance signal. It is assumed here that the image sensor of the image capture apparatus 100 has color filters configured as a primary color Bayer array. In this case, the RAW data is data in which each pixel has a single color component value, as indicated in a of FIG. 10. Note that FIG. 10 only illustrates an image region of the RAW data that has four pixels each in the horizontal and vertical directions. R stands for red, G for green, and B for blue.

First, the evaluation circuit 411 generates color plane image data (b in FIG. 10) by separating the RAW data into the respective color components and inserting zeros at pixel locations where no color components are present. Then, the evaluation circuit 411 applies publicly known interpolation processing to the color plane image data to interpolate the values of pixels where zeros have been inserted (c in FIG. 10).

Figure 10:
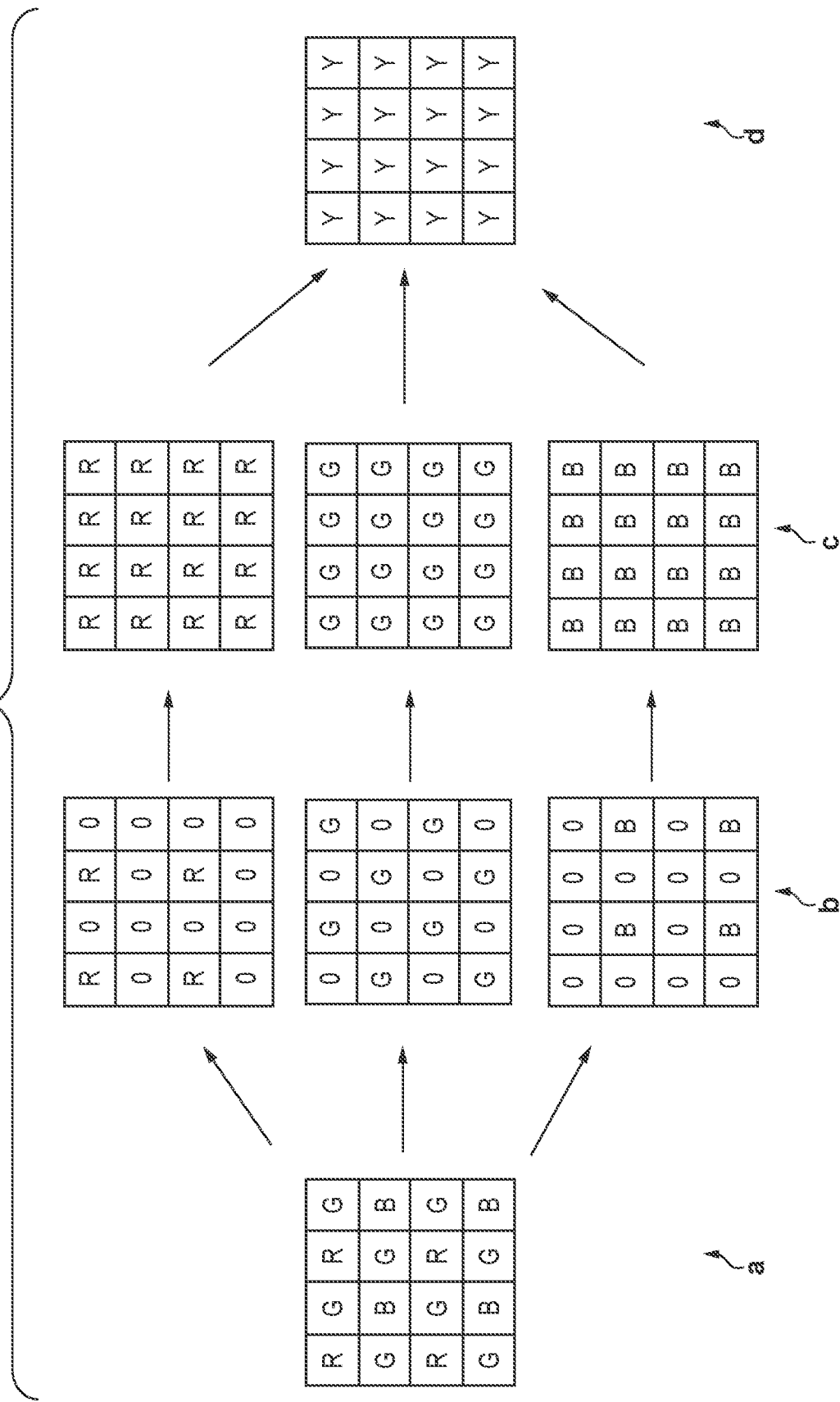
FIG. 10 is a diagram illustrating the third and fourth embodiments.

Next, using each instance of the post-interpolation color plane image data, the evaluation circuit 411 finds a luminance value Y at each pixel location through the following Equation 1, and generates luminance data (d in FIG. 10).

$$Y = 0.3 \times R + 0.6 \times G + 0.1 \times B \qquad \text{(Equation 1)}$$

Here, R, G, and B are values in each instance of the color plane image data.

In step S1602, the evaluation circuit 411 applies edge detection processing, using one pixel in the luminance data generated in step S1601 as a target pixel. The edge detection may be, for example, spatial filter processing using a Sobel filter, as illustrated in FIGS. 11A and 11B. FIG. 11A illustrates a Sobel filter for calculating a vertical direction edge strength $E_y$ of the target pixel, and FIG. 11B illustrates a Sobel filter for calculating a horizontal direction edge strength $E_x$ of the target pixel. The values obtained by applying the filters to the values of the eight pixels surrounding the target pixel are the vertical direction edge strength $E_y$ and the horizontal direction edge strength $E_x$. The spatial filter processing is a sum-of-products operation for the target pixel, the value of each of the pixels surrounding the target pixel, and a coefficient of a position corresponding to the spatial filter. Note that spatial filter coefficient and size illustrated in FIGS. 11A and 11B are merely examples. The edge strengths may be detected using other filters or methods.

The evaluation circuit 411 finds an edge strength E (change amount) of the target pixel through the following Equation 2, from the vertical direction edge strength $E_y$ and the horizontal direction edge strength $E_x$ calculated for the target pixel.

$$E=\{(Ex^2+Ey^2)\}^{1/2} \quad \text{(Equation 2)}$$

In step S1603, the evaluation circuit 411 determines whether or not the edge strength E found in step S1602 is greater than or equal to a threshold. If it is determined that the edge strength E is greater than or equal to the threshold, an edge flag is added to the target pixel in step S1604, after which step S1605 is executed. On the other hand, if the evaluation circuit 411 does not determine that the edge strength E is greater than or equal to the threshold in step S1603, step S1604 is skipped, and step S1605 is then executed.

In step S1605, the evaluation circuit 411 determines whether or not the edge detection processing has been applied to all of the pixels in the luminance data. If it is determined that the edge detection processing has been applied to all of the pixels, in step S1606, the evaluation circuit 411 calculates a number of pixels to which the edge flag has been added as the evaluation value of the RAW data. On the other hand, if it is not determined that the edge detection processing has been applied to all of the pixels, the processing from step S1602 is applied to the pixels to which the edge detection processing has not yet been applied.

The evaluation circuit 411 calculates the evaluation value for each instance of RAW data which is stored.

Returning to FIG. 8, in step S1210, the edge device 400' determines the RAW data to transmit to the server 200 on the basis of the evaluation value calculated in step S1209. Specifically, RAW data for which the evaluation value is greater than or equal to a pre-set threshold is transmitted to the server 200. The configuration may be such that the threshold can be adjusted in response to user instructions obtained via a user interface.

In step S1211, the edge device 400' transmits the RAW data determined in step S1210 to the server 200 over the network 300.

The operations of steps S408 to S410, performed by the server 200, the operations of steps S1011 and S1012, performed by the edge device 400', and the operations of steps S411 to S413, performed by the image capture apparatus 100, are the same as in the second embodiment and will therefore not be described here.

According to the present embodiment, the image data to which image processing is to be applied by the server 200 is evaluated by the edge device 400' for transition to the server 200, and RAW data on which the image processing by the server 200 is considered to have a great effect is transmitted to the server 200. Accordingly, the image capture apparatus 100 can receive a processing result of an image for which the image processing applied by the server 200 has a greater effect.

Note that the image data to be transmitted may be presented to the user before the edge device 400' transmits the image data to the server 200, and the image data may be transmitted after obtaining confirmation from the user. At this time, the configuration may be such that the user can select image data not to be transmitted.

Fourth Embodiment

A fourth embodiment of the present invention will be described next. An image processing system according to the present embodiment is configured so that the image data evaluation executed by the edge device 400' in the third embodiment is performed by the server 200, and the RAW data to which the image processing is applied is been determined. The descriptions will therefore focus on the differences from the third embodiment.

FIG. 12 is a block diagram illustrating an example of the functional configuration of a server 200' according to the present embodiment, which is configured by adding an effect determination program 212 to the ROM 203 of the server 200 described in the first embodiment. The other function blocks are the same as in the first embodiment and will therefore not be described.

By being executed by the control circuit 201, the effect determination program 212 implements the same functions as the evaluation circuit 411 of the edge device 400' according to the third embodiment.

The control circuit 201 evaluates image data (RAW data) received from the image capture apparatus 100 by executing the effect determination program 212. Then, the RAW data to which processing is to be applied by the image processing program 211 is determined on the basis of a result of the evaluation.

Interactive operations between the image capture apparatus 100, the edge device 400, and the server 200' will be described next with reference to the flowchart in FIG. 13. In the following, the control circuit 101 (CPU) is the main entity actually performing operations described as being executed by the image capture apparatus 100, the control circuit 201 (CPU) is the main entity actually performing operations described as being executed by the server 200', and the control circuit 401 (CPU) is the main entity actually performing operations described as being executed by the edge device 400. In FIG. 13, steps in which the same operations as those described in the first to third embodiments are performed have been given the same reference numerals as those in FIGS. 2, 6, and 8. Additionally, if it is necessary to register the edge device 400' as a communication partner prior to communicating with the edge device 400', it is assumed that such registration has already been performed in advance.

In FIG. 13, the operations of steps S401 to S406 are the same as in the second embodiment and will therefore not be described. In step S407, the image capture apparatus 100 transmits the RAW data to which the image processing is to be applied by the server 200' to the server 200' in the same manner as in the first embodiment.

In step S408, upon receiving the RAW data from the image capture apparatus 100, the server 200' stores the RAW data in the RAM 202, the storage device 205, or the like.

In step S1209, the control circuit 201 executes the effect determination program 212 stored in the ROM 203, and calculates an evaluation value for the RAW data received from the image capture apparatus 100. This processing may be the same as that described in the third embodiment.

In step S1210, on the basis of the evaluation value calculated in step S1209, the control circuit 201 determines whether or not to apply the image processing by the image processing program 211 to the RAW data received from the image capture apparatus 100. Specifically, the control circuit 201 determines to apply the image processing only to RAW data for which the image processing by the image processing program 211 is considered to have a great effect.

In step S409, the control circuit 201 executes the image processing program 211, and applies the image processing (here, development processing) to the RAW data determined in step S1210.

The subsequent operations of step S410, performed by the server 200', the operations of steps S1011 and S1012, performed by the edge device 400, and the operations of steps S411 to S413, performed by the image capture apparatus 100, are the same as in the second embodiment and will therefore not be described here.

According to the present embodiment, the server 200' evaluates the image data to which the server 200' is to apply image processing, and the image processing is applied only to RAW data for which the image processing by the server 200' is considered to have a great effect. Accordingly, the image capture apparatus 100 can receive a processing result only for an image for which the image processing applied by the server 200 has a greater effect.

Note that the configuration may be such that the image data is transmitted to the image capture apparatus 100, and presented to the user through the display circuit 109 of the image capture apparatus 100, before the image processing is applied by the server 200'. The image processing may then be applied after confirmation has been received from the image capture apparatus 100. At this time, the configuration may be such that the user can use the image capture apparatus 100 to select image data to which the image processing is not to be applied.

Fifth Embodiment

A fifth embodiment of the present invention will be described next. An image processing system according to the present embodiment is configured so that the processing performed by the server 200 upon receiving the RAW data according to the first embodiment is performed by the edge device 400. The configuration of the image processing system, as well as the functional configurations of the image capture apparatus 100, the server 200, and the edge device 400 according to the present embodiment, may be the same as in the second embodiment.

Interactive operations between the image capture apparatus 100, the edge device 400, and the server 200 will be described next with reference to the flowchart in FIG. 14. In the following, the control circuit 101 (CPU) is the main entity actually performing operations described as being executed by the image capture apparatus 100, the control circuit 201 (CPU) is the main entity actually performing operations described as being executed by the server 200, and the control circuit 401 (CPU) is the main entity actually performing operations described as being executed by the edge device 400. In FIG. 14, steps in which the same operations as those described in the first embodiment are performed have been given the same reference numerals as those in FIG. 2. Additionally, if it is necessary to register the edge device 400 as a communication partner prior to communicating with the edge device 400, it is assumed that such registration has already been performed in advance.

In FIG. 14, the operations of steps S401 to S406 are the same as in the first embodiment and will therefore not be described. In step S407, the image capture apparatus 100 transmits the RAW data to the edge device 400 instead of the server 200.

In step S408, upon receiving the RAW data from the image capture apparatus 100, the edge device 400 stores the data in the RAM 403, the recording circuit 407, or the like.

In step S409, the edge device 400 uses the image processing circuit 405 to apply the same image processing (development processing) to the RAW data as that applied by the server 200 executing the image processing program 211 in the first embodiment.

In step S1510, the edge device 400 displays the post-development processing image data in the display circuit 408.

Then, in step S410, the edge device 400 transmits the post-development processing image data to the image capture apparatus 100.

The operations of the image capture apparatus 100 in steps S411 to S413 are the same as in the first embodiment and therefore will not be described here.

In the present embodiment, the image processing for the original data of the proxy image data is performed by the edge device 400 instead of the server 200. The original data of the proxy image data has a large size, and has a particularly large size if the data is RAW data. Accordingly, having the edge device 400 apply the image processing instead of the server 200 makes it possible to greatly reduce the amount of image data exchanged with the server 200 over the network 300. This makes it possible to greatly reduce the communication costs for using the network 300, server costs, and the like.

Variation

The foregoing embodiment describes a configuration in which the image capture apparatus 100 determines the image data to which the image processing is applied by the external apparatus. In this case, as described in the embodiment, it is necessary to provide the image capture apparatus with a function (e.g., a program, a determination standard, or the like) for the image capture apparatus to determine, on the basis of a result of processing the proxy image data, the image data to which the image processing is applied by the external apparatus.

As described earlier, the hardware resources of the image capture apparatus are much more limited, both in terms of capacity and performance, than an edge device or a server, and it is therefore not easy to update the provided functions. Thus when an image processing program in the external apparatus has been updated, it is not always possible to update the function for the image capture apparatus for determining the image data to which the image processing is applied by the external apparatus, even when it is desirable to do so. In this case, the image capture apparatus can no longer appropriately determine the image data to be transmitted to the external apparatus.

As such, it is conceivable to have the server 200 or the edge device 400 perform the processing for determining the image data to which the image processing is applied by the external apparatus, executed by the image capture apparatus 100 in steps S405 and S406 in the foregoing embodiment. In this case, the server 200 or the edge device 400 requests the image capture apparatus 100 to transmit the determined image data, and the image capture apparatus transmits the requested image data to the server 200 or the edge device

400. For example, in the first embodiment, after performing the subject recognition processing in step S403, the server 200 makes, in step S404, a request, to the image capture apparatus 100, for the original data (which may be developed image data or RAW data) of the proxy image data in which a registered person has been detected. Then, in step S407, the image capture apparatus 100 transmits the original data to the server 200. Likewise, in the other embodiments as well, the apparatus that performs the image processing on the proxy image data can make a request for the original data of the proxy image data to the image capture apparatus. Alternatively, the apparatus that performs the image processing on the proxy image data (e.g., the edge device) may request the image capture apparatus to transmit the original data of the proxy image data to another apparatus (e.g., the server).

Note that the edge device 400 is closer to the server 200 than the image capture apparatus 100 in terms of performance, and it is also easy to update the software of the edge device 400. As such, even if the image processing program 211 of the server 200 has been updated and the determination standard for determining the image data that should be processed by the server 200 has changed, such a situation can be handled with ease. For example, a determination standard suited to the updated image processing program 211 may be transmitted from the server 200 to the edge device 400, and the determination standard used by the edge device 400 may be updated. Alternatively, the determination standard may be updated by updating the image processing system application of the edge device 400.

Furthermore, although the foregoing embodiments have been described using the image capture apparatus 100 as an example, the present invention can be applied in any information processing apparatus capable of handling image data.

Sixth Embodiment

The present embodiment relates to an image processing system having a configuration in which the image capture apparatus 100, the edge device 400 (first external apparatus), and the server 200 (second external apparatus) are connected to the network 300, as illustrated in FIG. 5A. However, parts of the functional configurations of the edge device 400 and the server 200 are different, and these will therefore be referred to as an edge device 400" and a server 200".

Figure 15:
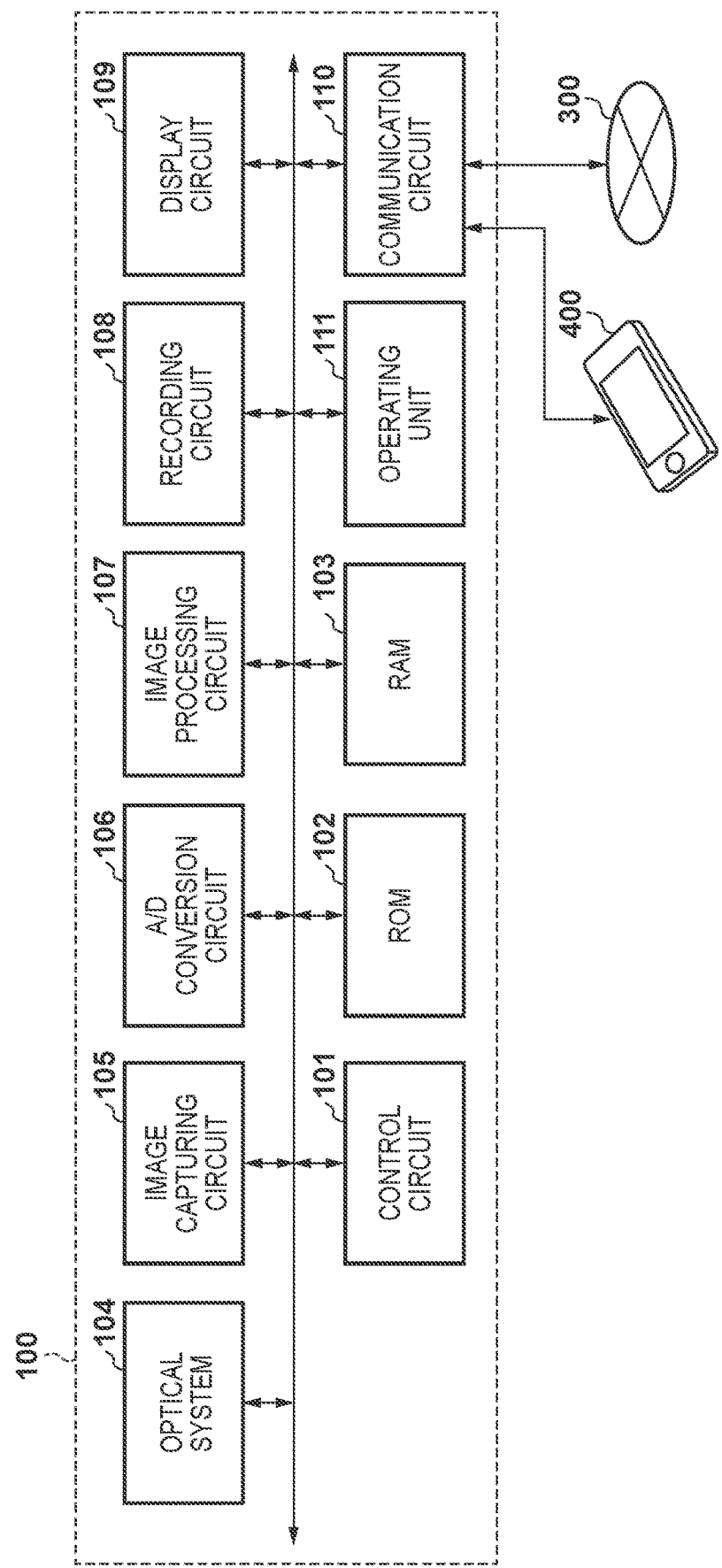
FIG. 15 is a block diagram illustrating an example of the functional configuration of an information processing apparatus according to a sixth embodiment.

As illustrated in FIG. 15, in the present embodiment, it is assumed that the communication circuit 110 of the image capture apparatus 100 includes a communication interface for the edge device 400" in addition to a communication interface for the network 300 (the server 200"). It is also assumed in the present embodiment that the communication between the image capture apparatus 100 and the edge device 400" is charged.

FIG. 15 is a block diagram illustrating an example of the functional configuration of the image capture apparatus 100. With the exception of the configuration of the communication circuit 110, the configuration may be the same as in the first embodiment, and thus function blocks aside from the communication circuit 110 will not be described.

In the present embodiment, the communication circuit 110 implements communication between the image capture apparatus 100 and the server 200" over the network 300, and wireless communication between the image capture apparatus 100 and the edge device 400". The control circuit 101 exchanges image data and the like with the server 200", the edge device 400", and the like through the communication circuit 110.

Figure 16A:
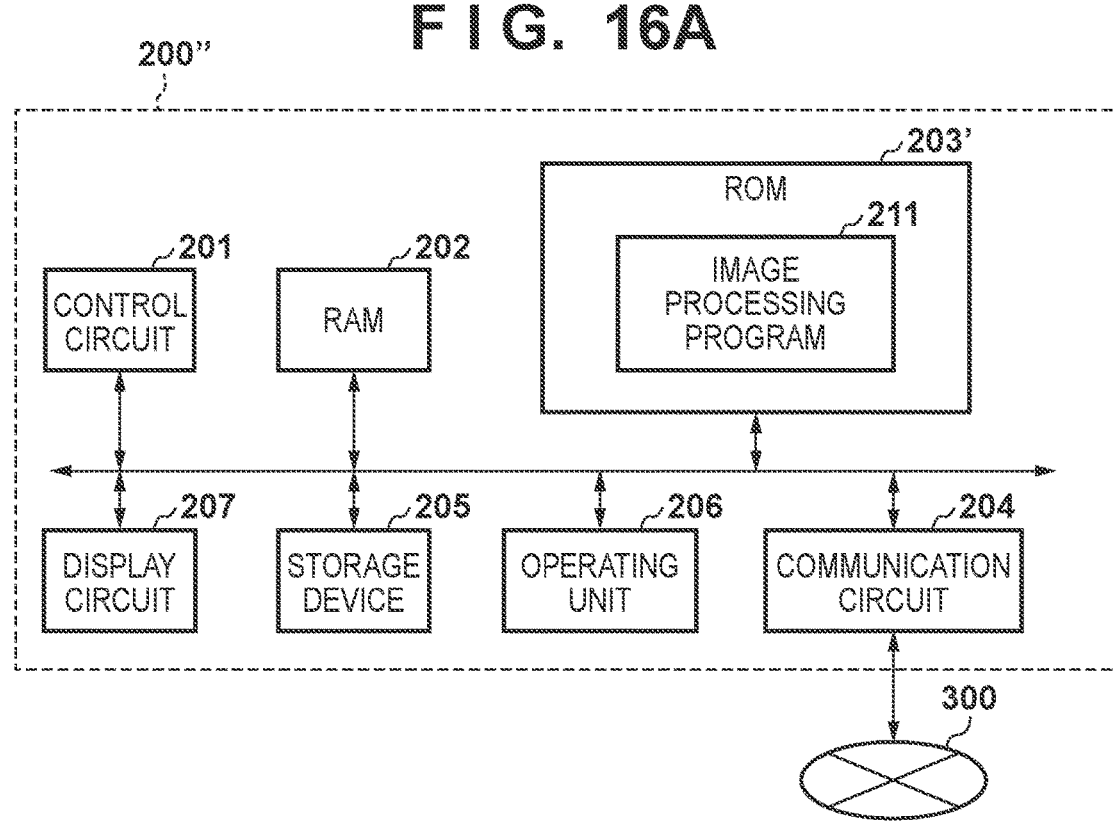
FIGS. 16A and 16B are block diagrams illustrating examples of the functional configurations of a server apparatus and an edge device according to the sixth embodiment.

FIG. 16A is a block diagram illustrating an example of the functional configuration of the server 200". The server 200" may have the same configuration as the server 200 described in the first embodiment with reference to FIG. 1C, except that it is not necessary to store the image recognition program in ROM 203'. Accordingly, matters which are common to the server 200 will not be described. Although the following will describe a case in which an image processing function provided by the server 200" is RAW data development processing, a different image processing function may be provided instead.

In the present embodiment, the communication circuit 204 implements communication between the server 200" and the image capture apparatus 100 over the network 300, and communication between the server 200" and the edge device 400" over the network 300. The control circuit 201 exchanges image data and the like with the image capture apparatus 100, the edge device 400", and the like through the communication circuit 204.

Note that the network 300 may be any publicly known network that supports data communication between the image capture apparatus 100 and edge device 400" and the server 200", and thus the specific configuration thereof will not be described here.

Figure 16B:
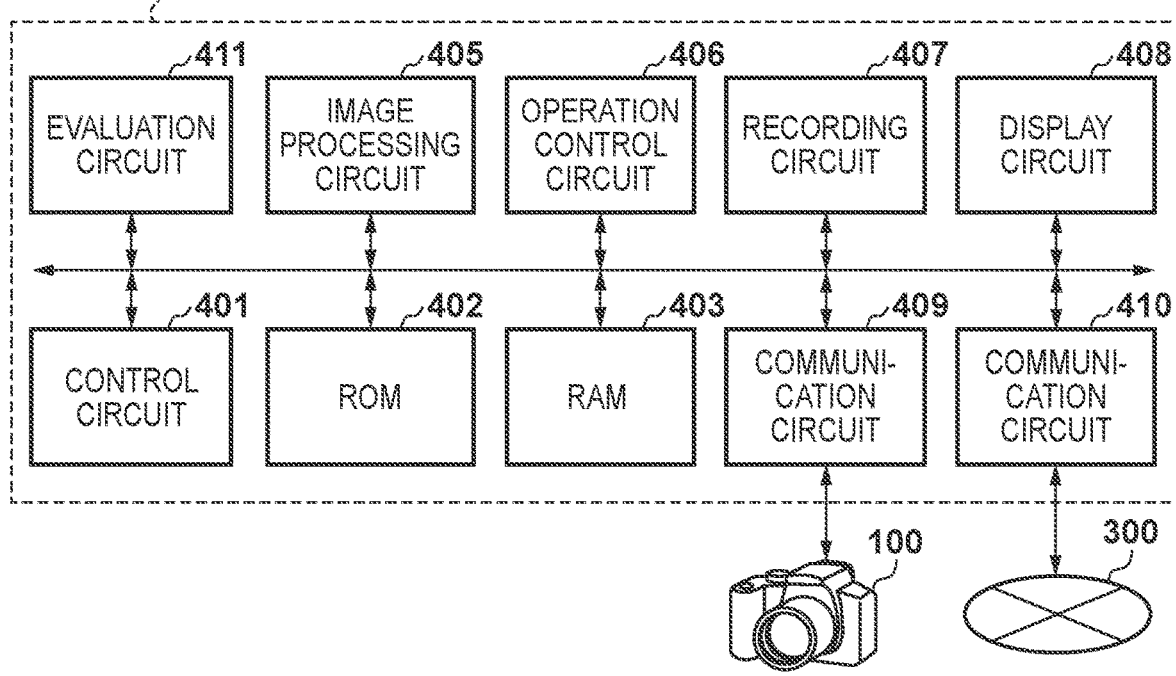

FIG. 16B is a block diagram illustrating an example of the functional configuration of the edge device 400". Aside from including the evaluation circuit 411 instead of the image recognition circuit 404, the edge device 400" may have the same configuration as the edge device 400 described in the second embodiment with reference to FIG. 5B. Accordingly, matters which are common to the edge device 400 will not be described.

In some embodiments, the evaluation circuit 411 calculates an evaluation value from image data. The evaluation value is used, for example, to determine an order of the transmission of RAW data subjected to image processing by an external apparatus with respect to the image capture apparatus 100. The evaluation circuit 411 may be the same as that described in the third embodiment with reference to FIGS. 9 to 11B. In an embodiment which does not use the evaluation value, the evaluation circuit 411 is not necessary.

Interactive operations between the image capture apparatus 100, the edge device 400", and the server 200" will be described next with reference to the flowchart in FIG. 17. In the following descriptions in the present specification, the operations described as being primarily performed by the image capture apparatus 100 are realized by the control circuit 101 (CPU) controlling other constituent elements of the image capture apparatus 100. Additionally, operations described as being primarily performed by the server 200" are realized by the control circuit 201 (CPU) controlling other constituent elements of the server 200". Furthermore, operations described as being primarily performed by the edge device 400" are realized by the control circuit 401 (CPU) controlling other constituent elements of the edge device 400". Unless otherwise noted in the following descriptions, when specific information, data, and the like is communicated between devices, other information, data, and the like not explicitly mentioned can also be communicated.

It is assumed that settings, information, and the like necessary for the image capture apparatus 100 to communicate with the server 200" and the edge device 400" are stored in the ROM 102 in advance. Additionally, if it is necessary to register the edge device 400" as a communication partner prior to the image capture apparatus 100 communicating with the edge device 400", it is assumed that such registration has already been performed in advance.

In step S1701, the image capture apparatus 100 transmits the proxy image data recorded by the recording circuit 108 from the communication circuit 110 to the edge device 400". This proxy image data is an example of information pertaining to image data recorded by the recording circuit 108. The timing at which step S1701 is executed is not particularly limited. For example, the step may be started upon confirmation that unprocessed RAW data is present in the recording circuit 108, or may be started in response to a user instruction. The transmitted proxy image data may be data which corresponds to the RAW data, data which corresponds to developed image data, or data selected by the user. Alternatively, all of the proxy image data may be transmitted.

Furthermore, proxy image data corresponding to RAW data which has not been subjected to the development processing (unprocessed RAW data) may be transmitted. This makes it possible, for example, to distinguish RAW data for which corresponding image data in a generic format (e.g., the JPEG format) is not recorded as unprocessed RAW data. Alternatively, a filename that makes it possible to distinguish whether or not the RAW data is unprocessed may be added, and the unprocessed RAW data may be determined from the filename. It is assumed that in step S1701, at least two pieces (frames) of the proxy image data are transmitted to the edge device 400".

In step S1702, the edge device 400" receives the proxy image data from the image capture apparatus 100 through the communication circuit 204. The edge device 400" stores the received proxy image data in the RAM 403.

In step S1703, the edge device 400" displays a list of images based on the proxy image data stored in the RAM 403 in a selectable format in the display circuit 408. For example, the edge device 400" displays an image selection screen, in which a list of images based on the proxy image data (proxy images) is displayed, in the display circuit 408, and makes a notification prompting the user to select an image on which the development processing is to be executed. Note that the number of proxy images displayed by the edge device 400" at one time in the display circuit 408, the display size of the proxy images, and the display order are not particularly limited. Reducing the display size enables a larger number of proxy images to be displayed at the same time and therefore increases the usefulness of the list, whereas increasing the display size makes it easier to see the details of the images. Note that it is not necessary to display all of the proxy images based on the proxy image data stored in the RAM 403 in a single screen. A publicly known method such as scrolling, turning pages, or the like may be used to split the list of proxy images across a plurality of screens.

By operating the operating unit 111 of the edge device 400", a user of the edge device 400" (who may or may not be the same as the user of the image capture apparatus 100) selects one or more of the proxy images. For example, if the display circuit 408 is a touch screen, the user can select an image by touching the image. The user may also select an image by operating a key, a button, or the like of the operating unit 111. The image selection performed here corresponds to selecting RAW data suited to the development processing by the server 200".

In step S1704, the edge device 400" transmits, to the image capture apparatus 100, selected file information (e.g., a filename) specifying the proxy image data corresponding to the proxy image selected by the user. Note that the selected file information transmitted from the edge device 400" to the image capture apparatus 100 in step S1704 can vary in accordance with information received from the image capture apparatus 100 along with the proxy image data. For example, when information specifying the RAW data corresponding to the proxy image data has been obtained, the edge device 400" may transmit information specifying the RAW data corresponding to the selected proxy image (e.g., a filename) to the image capture apparatus 100 as the selected file information. Any other information that enables the image capture apparatus 100 to specify the RAW data selected by the user to undergo development processing by the server 200" can be transmitted from the edge device 400" to the image capture apparatus 100 as the selected file information.

In step S1705, the image capture apparatus 100 stores the information received from the edge device 400" (the selected file information) in the RAM 103.

In step S1706, the image capture apparatus 100 specifies the RAW data on the basis of the selected file information. The image capture apparatus 100 then reads out the specified RAW data from the recording circuit 108 and transmits the data to the server 200" over the network 300.

In step S1707, the server 200" receives the RAW data and stores the data in the RAM 202, the storage device 205, or the like.

In step S1708, the server 200" loads the image processing program 211 from the ROM 203' into the RAM 202 and executes the program. The image processing program 211 applies the development processing to the RAW data. The development processing includes, for example, white balance processing, lens aberration correction processing, noise reduction (NR) processing, color interpolation processing, gamma processing, and the like. Additionally, an image data file in a predetermined format such as the JPEG format may be generated by applying encoding processing after the development processing. The server 200" may receive the RAW data in step S1707 and execute the image processing program 211 (apply the development processing) in step S1708 in parallel.

The development processing applied by the server 200" is processing based on a newer and/or more complex method than the processing performed by the image processing circuit 107 of the image capture apparatus 100, and can therefore achieve a better processing result than development processing applied by the image capture apparatus 100. This is due to the processing capabilities of the server 200" being higher than the processing capabilities of the image capture apparatus 100, and the image processing program 211 executed by the server 200" being based on newer technology than the image processing circuit 107 of the image capture apparatus 100.

When the reception of the RAW data in step S1707 is complete, in step S1709, the server 200" transmits a notification that the reception of the RAW data is complete to the image capture apparatus 100 over the network 300.

In step S1710, the image capture apparatus 100 receive the notification that reception is complete from the server 200".

In step S1711, the image capture apparatus 100 starts transmitting the RAW data, of the RAW data stored in the recording circuit 108, which was not transmitted in step S1707, to the server 200". Note that the RAW data transmitted to the server 200" in step S1711 does not necessarily have to be all of the RAW data not transmitted in step S1707

(i.e., the RAW data not selected by the user). This is because, for example, the RAW data stored in the recording circuit 108 can include RAW data for which the proxy image data was not transmitted to the server 200" in step S1701. Accordingly, the RAW data to be transmitted in step S1711 may be determined from the RAW data for which the proxy image data has been transmitted in step S1701, RAW data captured on or near the date on which the RAW data for which the proxy image data has been transmitted in step S1701, and so on.

In step S1712, the server 200" starts receiving the RAW data and stores the data in the RAM 202, the storage device 205, or the like.

In step S1713, the server 200" executes the same development processing as that executed in step S1708, on the RAW data received in step S1712. Note that the server 200" executes step S1713 after the execution of step S1708 is complete. The server 200" stores the developed image data, obtained from steps S1708 and S1713, in the storage device 205.

Figure 17:
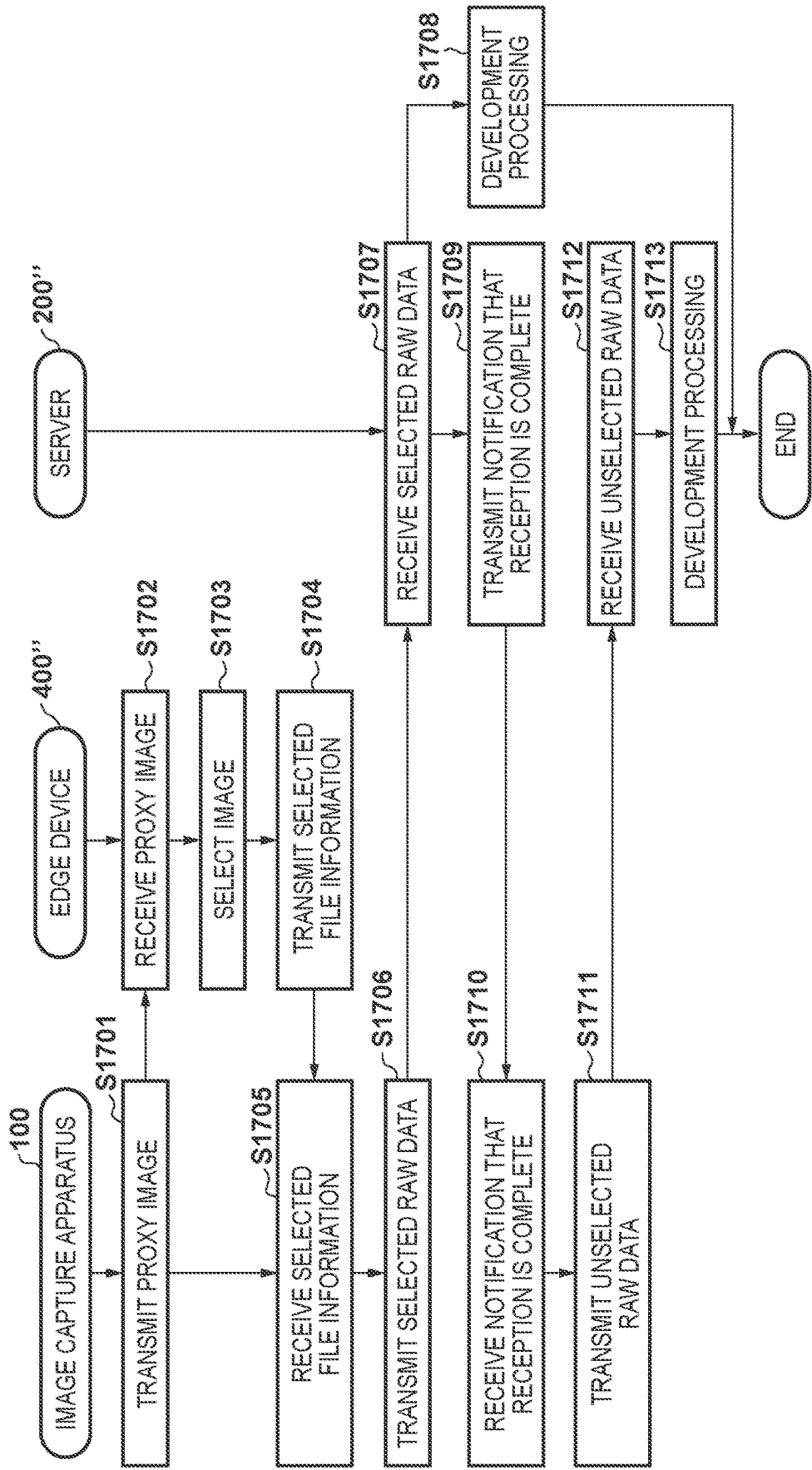
FIG. 17 is a flowchart pertaining to the sixth embodiment.

In FIG. 17, the developed image data obtained by the server 200" applying the development processing is stored in the server 200". This is because it is assumed that the communication between the image capture apparatus 100 and the server 200" is charged according to the amount of data communicated. In such a case, communication costs can be reduced by moving to an environment with fixed communication costs, such as a home, and then obtaining the developed image data from the server 200". However, the user may wish to confirm the developing result immediately, and thus the server 200" may transmit the image data to the image capture apparatus 100 in order from the image data for which the development processing is complete. The RAW data to which the development processing is applied in step S1708 is RAW data selected by the user, and thus the user can confirm the developing result of desired RAW data before the developing result of other RAW data.

In the present embodiment, the edge device is used to query the user as to the RAW data, among the RAW data present in the image capture apparatus, to which the user wishes to apply the development processing preferentially. Then, the image capture apparatus transmits the RAW data selected by the user to the external apparatus that executes the development processing before the other RAW data. Thus even if a large amount of RAW data is present in the image capture apparatus, the development processing can be executed preferentially on the user's desired RAW data. Accordingly, the wait time for the user can be reduced when executing the development processing using an external apparatus external to the image capture apparatus. Additionally, because the development processing is executed by the external apparatus, development processing using processing which cannot be executed by the image capture apparatus, development processing which is faster than that performed by the image capture apparatus, and the like can be performed.

Figure 18:
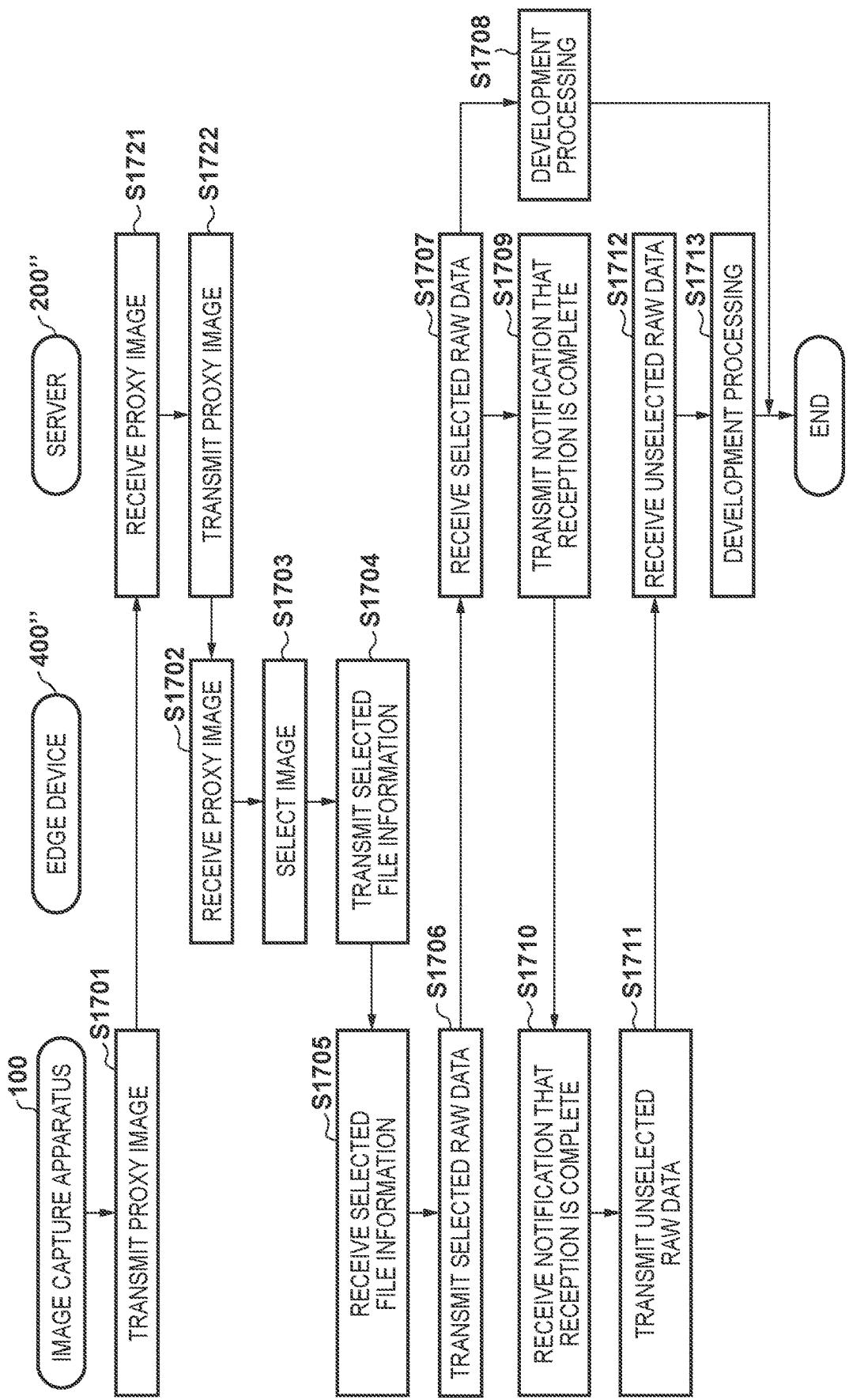
FIG. 18 is a flowchart pertaining to a variation on the sixth embodiment.

Although the present embodiment describes a configuration in which the proxy images are transmitted directly from the image capture apparatus 100 to the edge device 400", the proxy images may be transmitted via the server 200". For example, as illustrated in FIG. 18, in step S1701, the proxy image data is transmitted from the image capture apparatus 100 to the server 200", and in step S1721, the server 200" receives the proxy image data. Then, in step S1722, the server 200" transmits the proxy image data to the edge device 400". Step S1702 and on are the same as the sequence illustrated in FIG. 17. Note that rather than transmitting the selected file information directly from the edge device 400" to the image capture apparatus 100, the selected file information may be transmitted to the image capture apparatus 100 via the server 200". Employing such a configuration, in which the communication between the image capture apparatus 100 and the edge device 400" is performed via the server 200", makes it possible to carry out the present invention even in situations where the image capture apparatus 100 and the edge device 400" cannot communicate with each other directly.

Additionally, although the present embodiment describes the server 200" as executing the development processing, the development processing may be performed by the edge device 400". In this case, the processing executed by the server 200", illustrated in FIG. 17, may be executed by the edge device 400".

Seventh Embodiment

A seventh embodiment of the present invention will be described next. In the present embodiment, a development processing result for part of the RAW data is presented to the user, and the development processing is executed for the entirety of RAW data for which the need to execute the processing has been confirmed. This makes it possible to shorten the time and amount of data communication required to obtain a developing result for a partial region.

The present embodiment can be carried out by the same image processing system as that described in the sixth embodiment, and thus the configurations of the image capture apparatus 100, the server 200", and the edge device 400" will not be described.

Figure 19A:
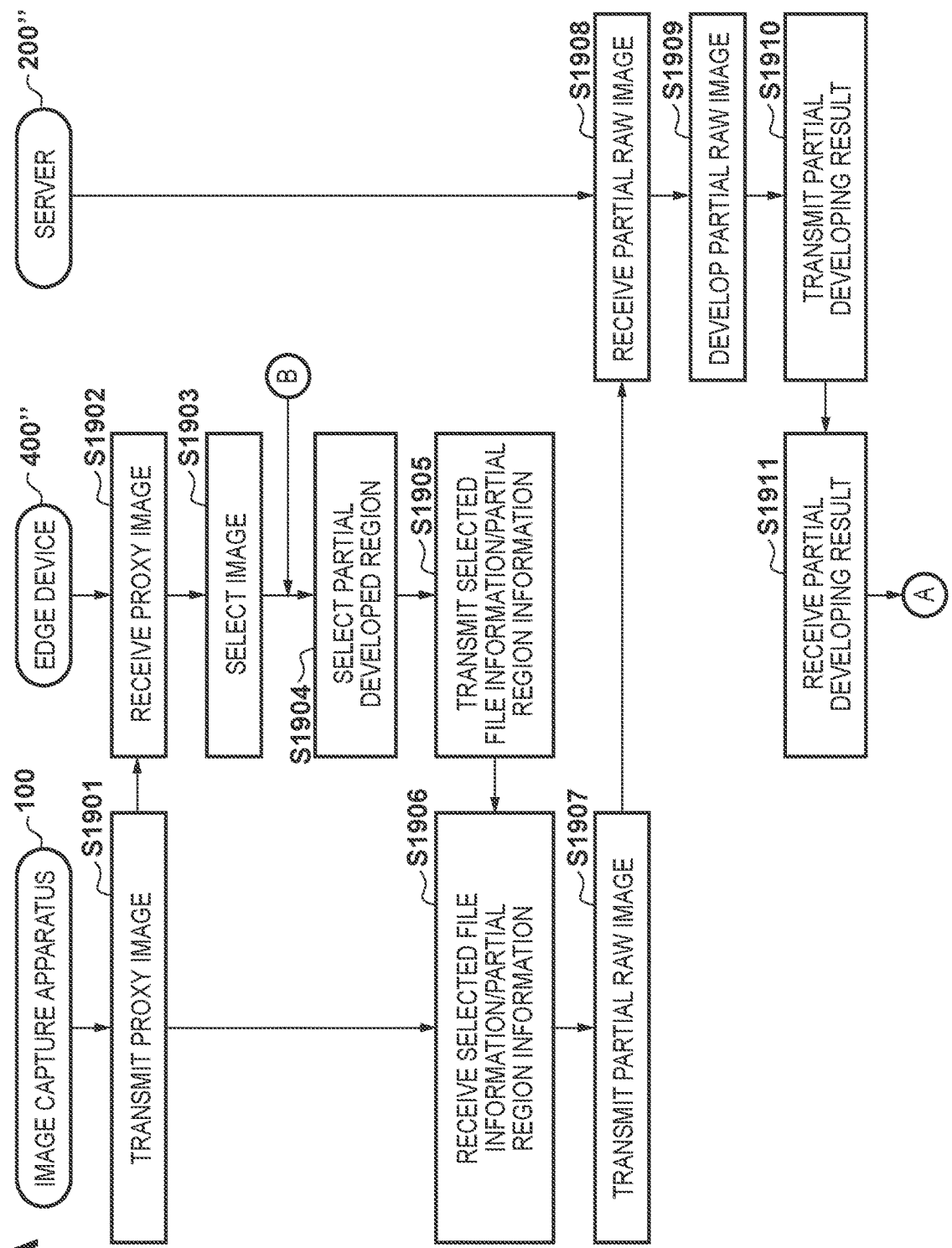

Interactive operations between the image capture apparatus 100, the edge device 400", and the server 200" according to the present embodiment will be described next with reference to the flowcharts in FIGS. 19A and 19B. Steps S1901 to S1903 are the same as steps S1701 to S1703 in the sixth embodiment and will therefore not be described here. Here, it is assumed that when one image is selected in step S1903, the edge device 400" executes step S1904.

Figure 20:
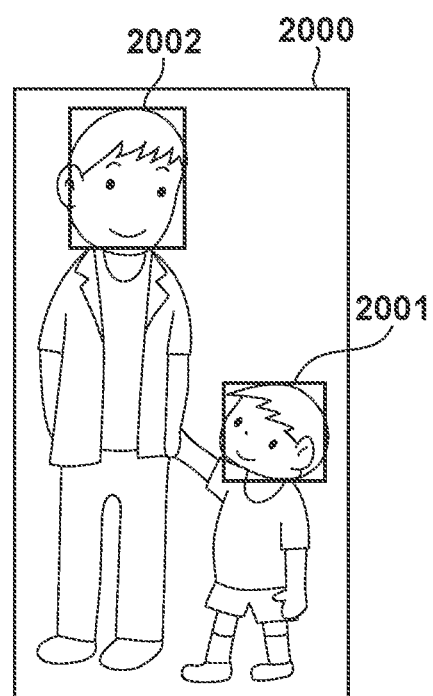
FIG. 20 is a diagram illustrating an example of a partial region according to the seventh embodiment.

In step S1904, the edge device 400" selects a partial region of the proxy image selected by the user in step S1903. This selection will be described further with reference to FIG. 20. FIG. 20 illustrates a proxy image 2000 selected by the user in step S1903. The control circuit 401 controls the image processing circuit 405 to execute feature region detection on the proxy image data corresponding to the proxy image selected by the user. The position and size of a region thought to be a person's face (a facial region) is assumed to be detected as the feature region. FIG. 20 illustrates an example in which facial regions 2001 and 2002 have been detected through the detection processing.

The edge device 400" can superimpose an indicator of the detected feature region (e.g., a rectangular indicator) over the proxy image selected in step S1903 and present the resulting display to the user. The edge device 400" selects one feature region for the proxy image in which a plurality of feature regions have been detected by allowing the user to select the feature region, or by automatically selecting the feature region according to a predetermined condition. An example in which the partial region on which to perform the development processing is selected from the feature region in advance is described here. However, the image may be divided into a plurality of regions using one or more of color, luminance, and distance information, and the user may then be allowed to select one of the regions. The user may also be allowed to select a desired partial region within the image.

In the example illustrated in FIG. 20, the user can select one of the two facial regions 2001 and 2002 by touching the display circuit 408, for example. Assume here that the facial region 2001 has been selected.

Returning to FIG. 19A, in step S1905, the edge device 400" transmits information specifying the partial region selected in the file (partial region information) to the image capture apparatus 100, in addition to the selected file information. Although the partial region information is not particularly limited, the coordinates of the vertices of opposing corners of the partial region in the proxy image can be given as an example. At this time, using coordinate values normalized according to the size of the proxy image in the horizontal direction and the vertical direction makes it possible to easily specify the position of the partial region in the corresponding RAW data.

In step S1906, the image capture apparatus 100 receives the selected file information and the partial region information, and stores that information in the RAM 103.

In step S1907, for the RAW data specified from the selected file information, the image capture apparatus 100 transmits the RAW data of the partial region based on the partial region information (partial RAW data) to the server 200" via the network 300.

In step S1908, the server 200" receives the partial RAW data.

In step S1909, the server 200" applies the development processing to the partial RAW data received in step S1908. The development processing which is applied may be the same as that of the sixth embodiment.

In step S1910, the server 200" transmits the result of developing the partial RAW data to the edge device 400" over the network 300, along with the information specifying the RAW data.

In step S1911, the edge device 400" receives the developing result and stores the developing result in the RAM 403. The edge device 400" displays the image corresponding to the developing result in the display circuit 408. The edge device 400" may display the developing result along with the entirety of the corresponding proxy image. Through the display circuit 408, the user can confirm the result of developing the partial region for an image they themselves selected in step S1903.

In the present embodiment, the edge device 400" displays the image that is the developing result so that the user can select one of an instruction to execute the development processing on the entire image, an instruction to reselect the partial region, and an instruction to cancel the development processing. The edge device 400" can, for example, display selectable icons corresponding to these instructions next to the image that is the developing result.

In step S1912, the edge device 400" branches the sequence according to the user instruction which has been received. The edge device 400" executes step S1904 if the instruction to reselect the partial region has been detected, and executes step S1913 if the instruction to execute the development processing on the entire image has been detected. Although not illustrated in the drawings, the edge device 400" ends the display of the corresponding image if the cancel instruction is detected.

When step S1904 is executed in response to the instruction to reselect the partial region, the edge device 400" can display the indicators of the feature regions aside from the feature region which has already been selected. When the user selects a new partial region, the processing from step S1905 is executed again for the target image.

On the other hand, in step S1913, the edge device 400" transmits the information specifying the RAW data, along with a notification requesting that the entire image undergo development processing (a main development request), to the image capture apparatus 100.

In step S1914, the image capture apparatus 100 receives the main development request, and the information specifying the RAW data to be processed, and stores these items in the RAM 103. The operations from step S1915, in which the entirety of the RAW data is transmitted, are the same as the operations from steps S1706 to S1713 in FIG. 17, described in the sixth embodiment, and will therefore not be described in detail here.

Here, to simplify the descriptions and facilitate understanding, the flow of operations for a single proxy image displayed in the edge device 400" has been described. When a plurality of proxy images are to be displayed in the display circuit 408, the same processing as that executed for the image selected in step S1903 is executed for the remaining proxy images. Note that a configuration is also possible in which the processing from steps S1903 to S1911 is executed for a plurality of proxy images at the same time. In other words, when a plurality of proxy images are selected in step S1903, the edge device 400" transmits the selected file information and the partial region information for the plurality of images to the image capture apparatus 100 at once. Then, the transmission of the partial RAW data, the development processing, and the transmission of the developing result are executed all together for the plurality of images, and the developing results for the plurality of images are ultimately displayed in the display circuit 408. Thereafter, the requests for the overall development processing and the reselection of the partial regions can each be executed at the same time.

According to the present embodiment, in addition to the effects of the sixth embodiment, the user can determine whether or not it is necessary to execute the development processing on the entirety of a selected image after first confirming the developing result for a partial region. Executing the development processing for the partial region first reduces the amount of data communication and reduces the load of the development processing, and thus the user can quickly confirm the developing result for the partial region. Then, if there is RAW data for which it is determined, on the basis of the developing result of the partial region, that the development processing need not be performed on the entirety of the data, the amount of data communication using the network 300 can be reduced. Note that destructive or non-destructive processing for reducing the data amount can also be applied to the partial RAW data, and in this case, the amount of data communication can be reduced even further.

Furthermore, the development processing performed on the partial RAW data or the RAW data does not necessarily have to be executed by the server 200", and may be at least partially executed by the edge device 400".

Eighth Embodiment

An eighth embodiment of the present invention will be described next. The present embodiment corresponds to a variation on the seventh embodiment. Specifically, the partial RAW data and the developing result thereof according to the seventh embodiment are not repeatedly transmitted between devices, which makes it possible to further reduce the amount of data communication.

Like the seventh embodiment, the present embodiment can be carried out by the same image processing system as that described in the sixth embodiment, and thus the configurations of the image capture apparatus 100, the server 200", and the edge device 400" will not be described.

Figure 21A:
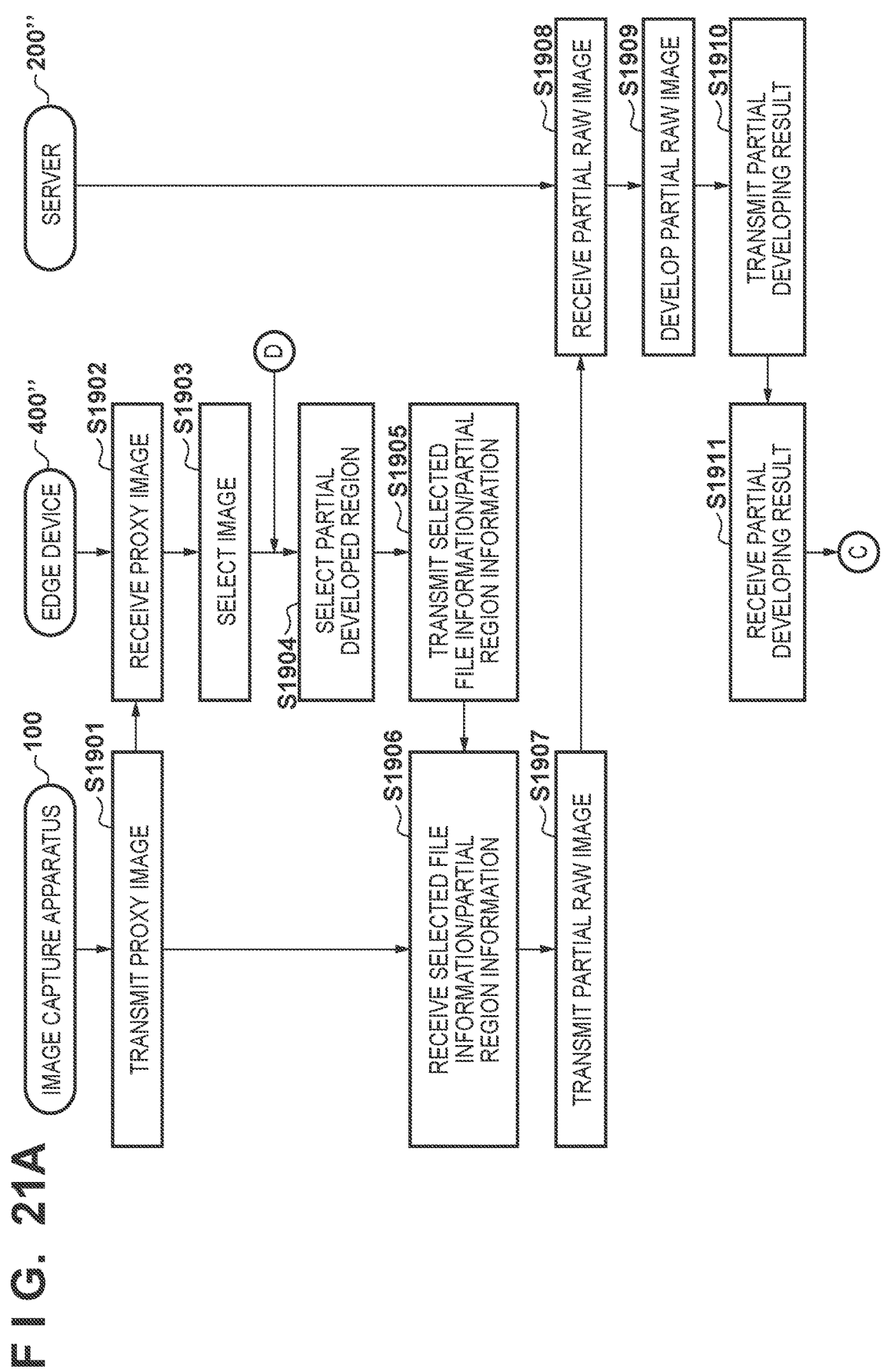
FIGS. 21A and 21B are flowcharts pertaining to an eighth embodiment.
Figure 21B:
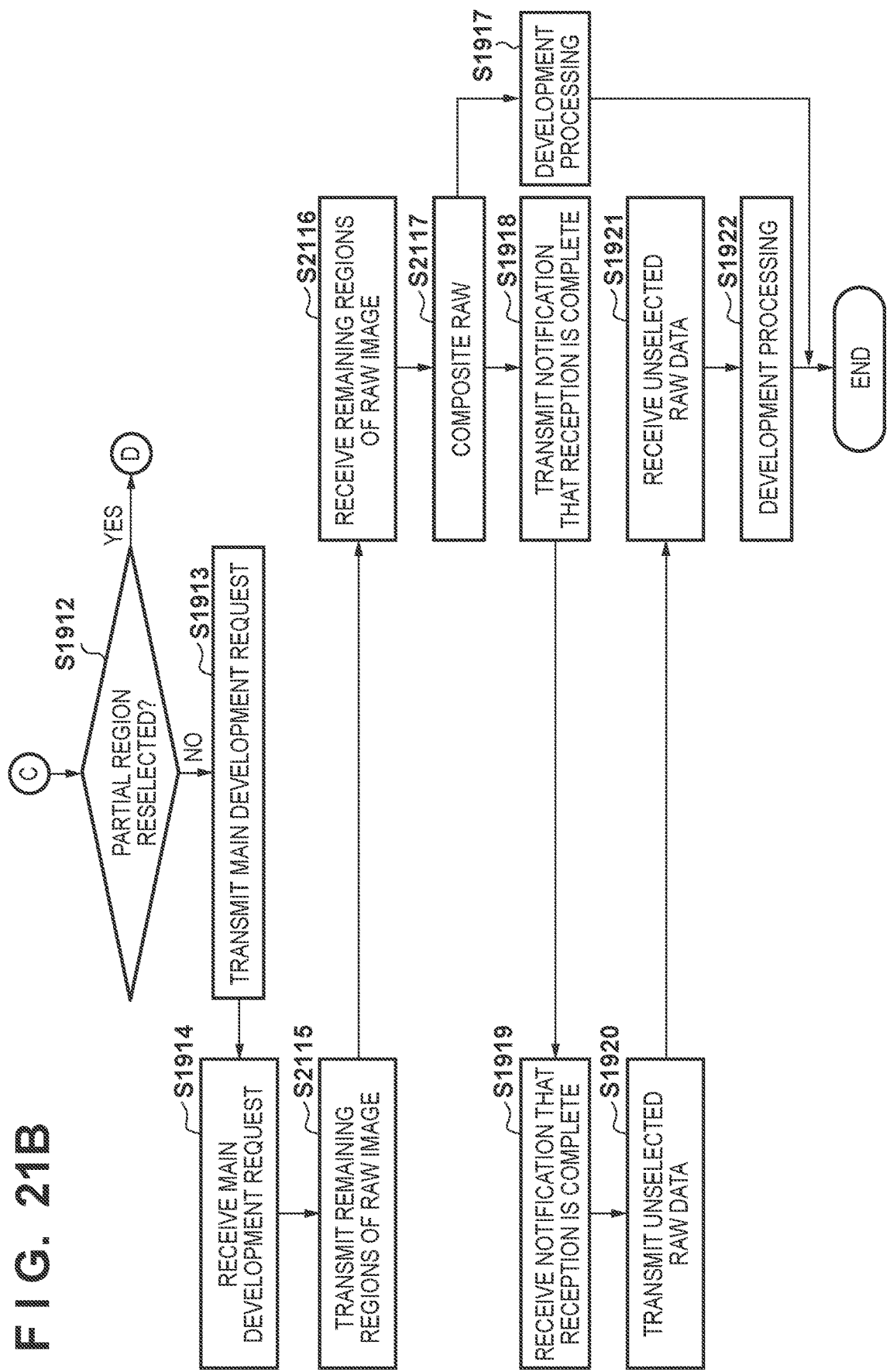

Interactive operations between the image capture apparatus 100, the edge device 400", and the server 200" according to the present embodiment will be described next with reference to the flowcharts in FIGS. 21A and 21B. In FIGS. 21A and 21B, processes that are the same as in the seventh embodiment are given the same reference numerals. Steps S1901 to S1914 are the same as in the seventh embodiment and will therefore not be described here.

Upon the main development request being received in step S1914, in step S2115, the image capture apparatus 100 transmits the RAW data to be subjected to the main development to the server 200", with the exception of the partial RAW data transmitted to the server 200" in step S1907. For example, when partial RAW data corresponding to the facial region 2001 has been transmitted to the server 200" in step S1907, the image capture apparatus 100 transmits the RAW data corresponding to regions aside from the facial region 2001 (the remaining regions) to the server. By referring to the selected file information and the partial region information stored in the RAM 103, the image capture apparatus 100 can generate RAW data which excludes the partial RAW data already transmitted.

In step S2116, the server 200" receives the RAW data excluding the partial RAW data received in step S1908.

In step S2117, the server 200" generates RAW data corresponding to the entire image by compositing the partial RAW data received in step S1908 with the RAW data received in step S2116.

The subsequent processing from step S1917 is the same as that in the seventh embodiment and will therefore not be described.

According to the present embodiment, when main development (the development processing for the entire image) is performed on the RAW data for which the development processing has already been performed on a partial region, the image capture apparatus 100 does not retransmit the partial RAW data which has already been transmitted to the server 200". Thus in addition to the effects of the seventh embodiment, the amount of data communication from the image capture apparatus 100 to the server 200" can be reduced.

In the present embodiment too, the development processing performed on the partial RAW data or the RAW data does not necessarily have to be executed by the server 200", and may be at least partially executed by the edge device 400".

Ninth Embodiment

A ninth embodiment of the present invention will be described next. In the present embodiment, an order in which the RAW data is transmitted to the external apparatus is determined in accordance with a predetermined condition. The present embodiment, too, can be carried out by the same image processing system as that described in the sixth embodiment, and thus the configurations of the image capture apparatus 100, the server 200", and the edge device 400" will not be described.

Figure 22:
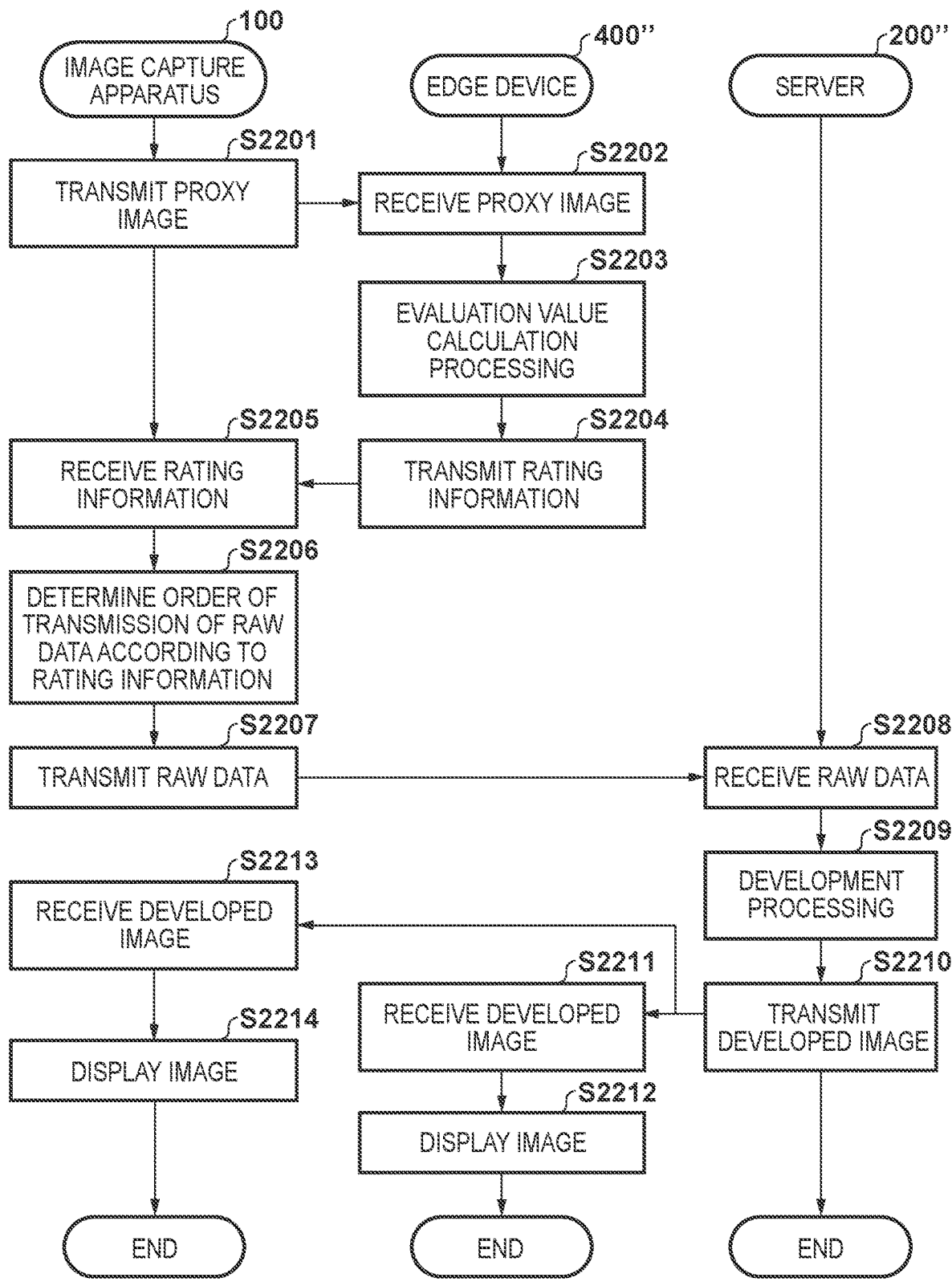
FIG. 22 is a flowchart pertaining to a ninth embodiment.

Interactive operations between the image capture apparatus 100, the edge device 400", and the server 200" according to the present embodiment will be described next with reference to the flowchart in FIG. 22. In FIG. 22, steps S2201 and S2202 are the same as steps S1701 and S1702 in the sixth embodiment, and will therefore not be described.

In step S2203, the edge device 400" calculates a predetermined evaluation value for the proxy image data stored in the RAM 403. This evaluation value is an evaluation value serving as an indicator of the magnitude of the effect achieved by the external apparatus (the server 200" or the edge device 400") performing the development processing on the RAW image data corresponding to the proxy image data. Accordingly, the evaluation value of the proxy image data can be considered to be an evaluation value of the corresponding RAW data.

Operations performed by the evaluation circuit 411 for calculating the evaluation value in the edge device 400" may be the same as those described in the third embodiment with reference to FIGS. 9 to 11B.

The evaluation circuit 411 calculates the evaluation value for each instance of proxy image data which is stored. The calculated evaluation values are stored in the RAM 403.

Returning to FIG. 22, in step S2204, the edge device 400" rearranges the evaluation values found in step S2203 in order from the highest evaluation value, and generates rating information associated with the corresponding proxy image data. The edge device 400" then transmits the rating information to the image capture apparatus 100. The rating information is information indicating a priority order of the proxy image data (and the image data on which the proxy image data is based).

In step S2205, the image capture apparatus 100 receives the rating information and stores the rating information in the RAM 103.

In step S2206, in accordance with the rating information, the image capture apparatus 100 determines a transmission order for the RAW data to be transmitted to the server 200", such that RAW data having a higher evaluation value is transmitted first. Note that when determining the transmission order, RAW data having an evaluation value lower than a pre-set threshold may be excluded from the transmission. Additionally, the configuration may be such that the threshold can be adjusted in response to user instructions obtained via a user interface.

In step S2207, the image capture apparatus 100 transmits the RAW data sequentially to the server 200" according to the transmission order determined in step S2206.

In step S2208, the server 200" receives the RAW data and stores the data in the RAM 202 or the storage device 205.

In step S2209, the server 200" executes the image processing program 211 and applies the development processing to the RAW data, in the same manner as in step S1708 in the sixth embodiment. Note that the server 200" may receive the RAW data in step S2208 and execute the image processing program 211 (apply the development processing) in step S2209 in parallel.

In step S2210, the server 200" transmits the developing result (the developed image data) to at least one of the image capture apparatus 100 and the edge device 400" over the network 300, in order from the RAW data for which the development processing has finished being applied.

When the edge device 400" receives the developed image data from the server 200", in step S2211, the edge device 400" stores the received image data in the RAM 403. Then, in step S2212, the edge device 400 displays the image data stored in the RAM 403 in the display circuit 408, and records the image data into the recording circuit 407.

When the image capture apparatus 100 is to receive the developed image data from the server 200", in step S2213, the image capture apparatus 100 receives the developed image data from the server 200" and stores that data in the RAM 103. Then, in step S2214, the image capture apparatus 100 supplies the image data stored in the RAM 103 to the image processing circuit 107, and causes image data for recording and image data for display to be generated. The image capture apparatus 100 then causes the display circuit 109 to display the image data for display, and causes the recording circuit 108 to record the image data for recording.

According to the present embodiment, the magnitude of the effect of the external apparatus (e.g., the server 200") applying image processing is evaluated by the edge device 400" for the RAW data in the image capture apparatus 100, and the RAW data is transmitted to the server 200" in order from the RAW data for which the effect is considered to be the greatest. Accordingly, the image capture apparatus 100 can receive processing results in order from the RAW data for which the effect of the image processing by the external apparatus is greatest.

The present embodiment can be combined with the sixth to eighth embodiments. Specifically, the calculation of the evaluation value, the determination of the transmission order, and the development processing may be performed only on image data selected by the user. In this case, in addition to the effects of the sixth to eighth embodiments, processing results can be received in order from the RAW data for which the effect of the image processing by the external apparatus is greatest, for the RAW data selected by the user.

Although the evaluation circuit 411 calculates the evaluation value on the basis of an edge detection result in the present embodiment, the evaluation value may be calculated on the basis of another standard based on the properties of the development processing performed by the server 200". Additionally, the evaluation value is not limited to an indicator of the magnitude of the effect of the development processing performed by the server 200", and may be an indicator of image quality. For example, an evaluation value based on an aesthetic quality of a composition, an evaluation value based on a level of focus, an evaluation value based on the correctness of exposure, an evaluation value based on an expression of a subject, such as a degree of smiling, and the like may be calculated. A plurality of types of evaluation values may also be calculated, and the transmission order may then be determined on the basis of an average value, a maximum value, or the like thereof. Note that the evaluation value calculation is not limited to be performed by the edge device 400", and may be performed by the image capture apparatus 100 or the server 200" instead.

Tenth Embodiment

A tenth embodiment of the present invention will be described next. In the present embodiment, the method for finding the indicator of the magnitude of the effect of the external apparatus applying the image processing is different from that in the ninth embodiment. The present embodiment, too, can be carried out by the same image processing system as that described in the sixth embodiment, and thus the configurations of the image capture apparatus 100, the server 200", and the edge device 400" will not be described.

In the present embodiment, the magnitude of the effect of the external apparatus applying the image processing is evaluated in more detail by evaluating an image taking in account a plurality of types of evaluation values, in light of the performance of the image processing provided by the external apparatus. This makes it possible to make evaluations which reflect performance improvements resulting from updating the image processing program 211 provided by the external apparatus.

Figure 23:
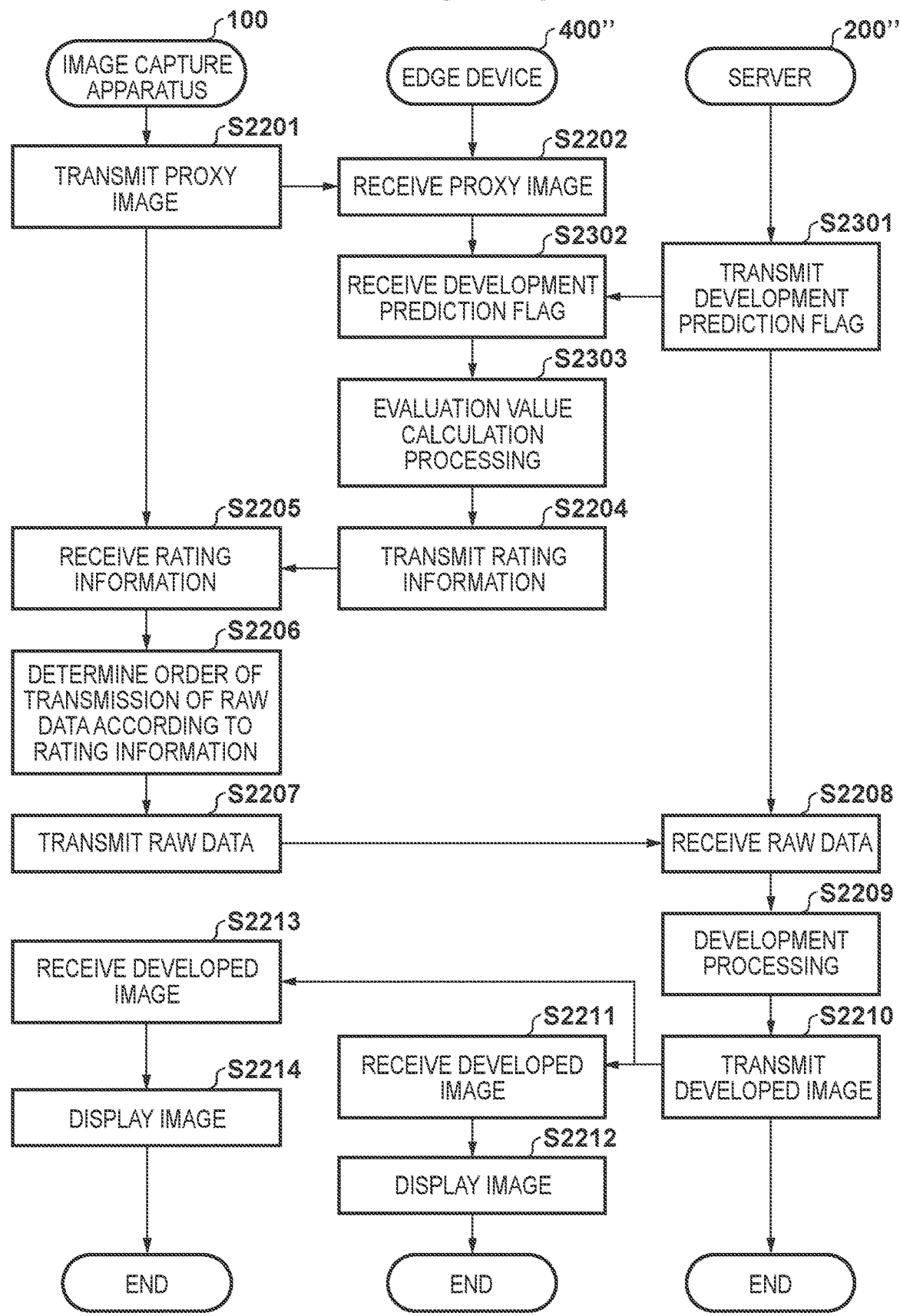
FIG. 23 is a flowchart pertaining to a tenth embodiment.

Interactive operations between the image capture apparatus 100, the edge device 400", and the server 200" according to the present embodiment will be described next with reference to the flowchart in FIG. 23. In FIG. 23, steps in which the same operations as in the ninth embodiment are carried out have been given the same reference numerals as those in FIG. 22. Operations that are the same as in the ninth embodiment will not be described, and the following will focus on operations characteristic to the present embodiment.

In step S2301, the server 200" generates a development prediction flag and transmits that flag to the edge device 400". The development prediction flag is information serving as an indicator of the performance of the various image processing functions provided by the image processing program 211 of the server 200". For example, the development processing, which is an example of an image processing function provided by the image processing program 211, includes a plurality of types of processing, such as white balance processing, lens aberration correction processing, noise reduction (NR) processing, color interpolation processing, and gamma processing. The development prediction flag may be information provided for each of these types of processing, having a value of "1" when the processing is capable of high performance and "0" for other processing. Note that the development prediction flag need not be generated each time step S2301 is executed, and can be stored in advance in the ROM 203'. The necessary part is then updated when the image processing program 211 is updated.

Although the method for evaluation high or low performance is not particularly limited, an application, module, or the like that realizes the processing having been updated within the past year, processing that has a higher load, and so on are considered to be highly likely to have higher performance. Alternatively, a vendor of the image processing program 211 may provide an update to the development prediction flag when updating the program.

In step S2302, the edge device 400" receives the development prediction flag from the server 200".

In step S2303, the edge device 400" calculates the evaluation value for each instance of the proxy image data recorded in the RAM 403.

Figure 24:
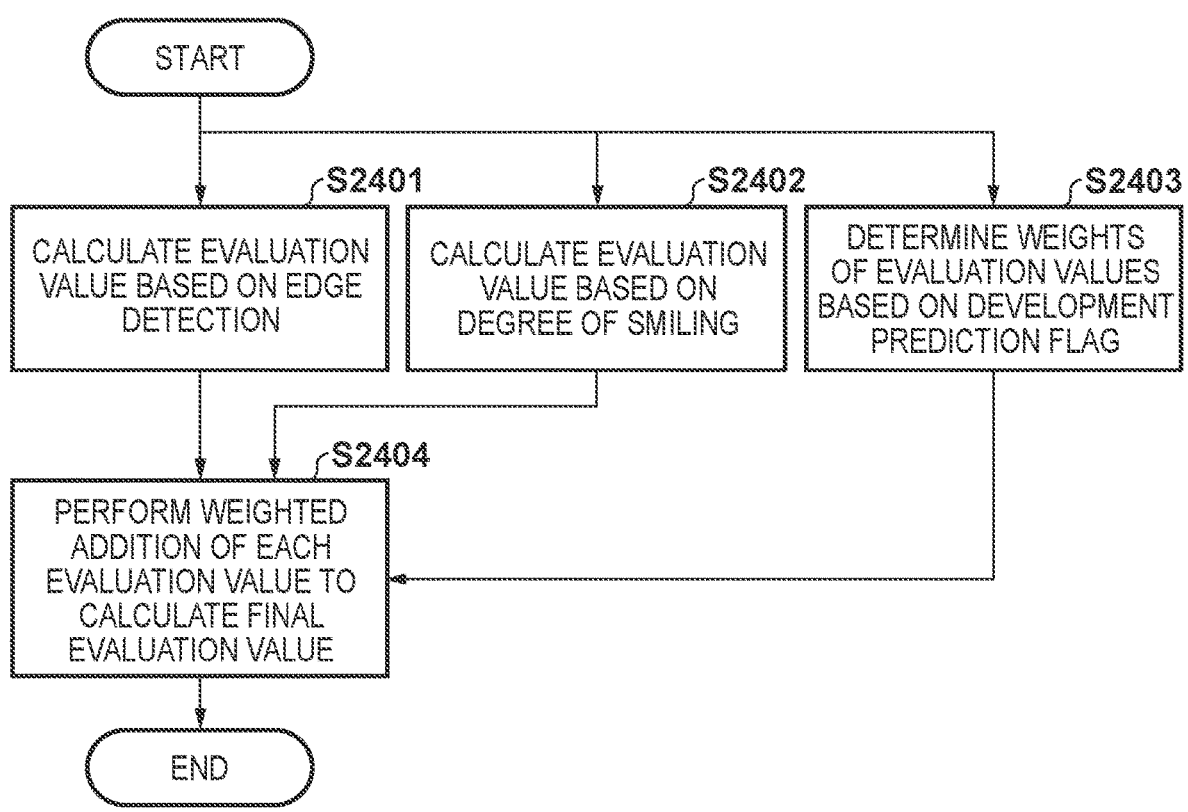
FIG. 24 is a flowchart pertaining to the tenth embodiment.

Operations performed by the evaluation circuit 411 in step S2303 will be described with reference to the flowchart in FIG. 24. In the present embodiment, the evaluation circuit 411 calculates the evaluation values for the individual instances of proxy image data by weighting the plurality of types of evaluation values in accordance with the development prediction flags.

In step S2401, the evaluation circuit 411 calculates a first evaluation value for the proxy image data, based on the same type of edge detection is that described in the ninth embodiment.

In step S2402, the evaluation circuit 411 calculates a person's degree of smiling as a second evaluation value by applying a publicly known method to the proxy image data. The person's degree of smiling is a numerical value indicating the degree to which a facial region detected from the proxy image data is a smile. Applications for finding the degree of smiling from an image are publicly known, and for example, the second evaluation value can be obtained by providing the image processing circuit 405 with such an application. For a proxy image in which a plurality of facial regions are present, an average value, a maximum value, or the like of the degree of smiling is taken as the second evaluation value, for example. The first and second evaluation values are both normalized to a range of 0 to 1.

In step S2403, the evaluation circuit 411 determines weights of the first and second evaluation values on the basis of the development prediction flags. Methods of calculating the weights based on the development prediction flags are registered in the evaluation circuit 411 in advance for each type of evaluation value. Then, after adjusting the proportion of the weights so that a total of the weight for the first evaluation value and the weight for the second evaluation value is 1, the evaluation circuit 411 performs weighted addition of the first and second evaluation values to calculate the final evaluation value.

By calculating the evaluation values for the individual instances of proxy image data in this manner, evaluation values based on the properties of the image processing program 211 of the server 200" can be calculated, and the magnitude of the effect of the server 200" performing the development processing can be evaluated in more detail. Additionally, if the image processing program 211 has been updated and the prediction flight has changed, an evaluation value reflecting that change can be obtained. An appropriate evaluation can therefore always be performed.

For example, assume that a method for noise reduction (NR) processing in the image processing program 211 has been changed so that noise reduction processing with a higher level of performance than before is possible, and a noise reduction processing flag in the development prediction flag has also changed from "0" to "1". In this case, the improvement in the performance of the noise reduction processing has a major effect on an improvement in the result of development processing performed on images with many edges, and thus the weight on the first evaluation value becomes greater than the weight from before the image processing program 211 was updated.

For example, when the first evaluation value is represented by Sedge and the second evaluation value is represented by S face, an evaluation value S obtained from weighted addition can be found as:

$$S=(S\_edge \times \alpha)+(S\_face \times (1-\alpha)) \quad \text{(Equation 3)}$$

Then, for a weight α on the first evaluation value, the evaluation circuit 411 sets a weight $\alpha_{after}$, from after the image processing program 211 was updated, to be greater than a weight $\alpha_{before}$, from before the image processing program 211 was updated, in accordance with the change in the development prediction flag ($\alpha_{after} > \alpha_{before}$). As a result, an evaluation value from after the weighted addition, which reflects the update in the image processing program 211, is obtained.

Returning to the flowchart in FIG. 23, in step S2204, the edge device 400" generates the rating information and transmits that information to the image capture apparatus 100 in the same manner as in the ninth embodiment, with the exception that the evaluation value found in step S2303 is used. The subsequent processing is the same as in the ninth embodiment, and will therefore not be described here.

According to the present embodiment, an evaluation value calculated by performing weighted addition of a plurality of evaluation values is used, and the weighting is determined so as to increase the weight of the evaluation values to better reflect the effect of the external apparatus applying the image processing. Accordingly, in addition to the same effects as those of the ninth embodiment, the image processing by the external apparatus can be applied in an order that reflects the latest image processing provided by the external apparatus.

The present embodiment describes a case where a proportion (weight) is determined for the weighted addition of an evaluation value based on edge detection and an evaluation value based on a degree of smiling, on the basis of the development prediction flag. However, the types of evaluation values are not limited thereto. An evaluation value based on an aesthetic quality of a composition, an evaluation value based on a level of focus, an evaluation value based on the correctness of exposure, an evaluation value based on an expression of a subject, such as a degree of smiling, and the like may be calculated, in the same manner as in the ninth embodiment. Additionally, the weighted addition may be performed on three or more types of evaluation values. Note that the evaluation value calculation is not limited to be performed by the edge device 400", and may be performed by the image capture apparatus 100 or the server 200" instead.

Eleventh Embodiment

An eleventh embodiment of the present invention will be described next. The present embodiment differs from the ninth embodiment in that when transmitting the RAW data to the external apparatus in accordance with the transmission order determined on the basis of the evaluation values, a maximum number of instances of RAW data to be transmitted can be limited. The present embodiment, too, can be carried out by the same image processing system as that described in the sixth embodiment, and thus the configurations of the image capture apparatus 100, the server 200", and the edge device 400" will not be described.

Figure 25:
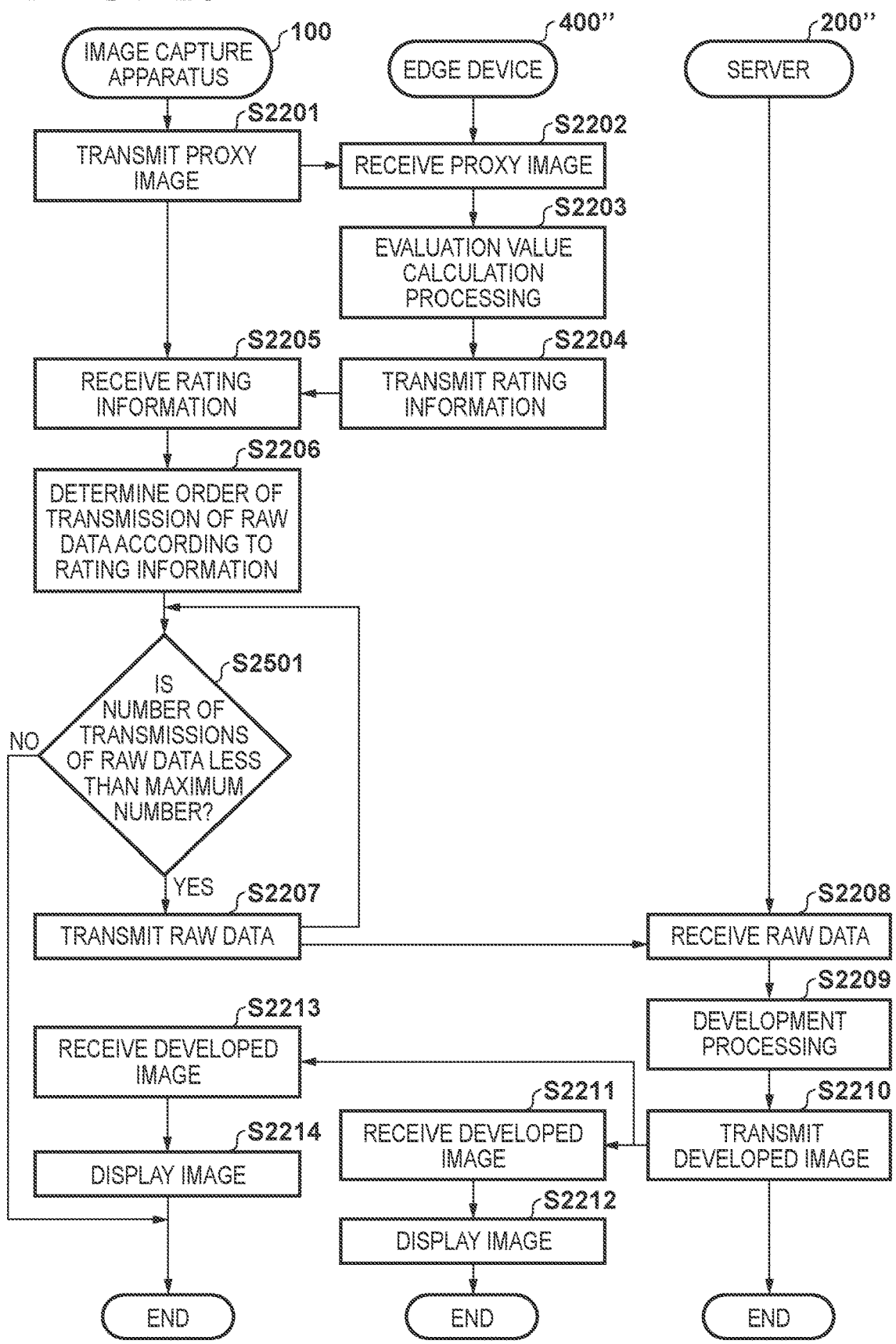
FIG. 25 is a flowchart pertaining to an eleventh embodiment.

Interactive operations between the image capture apparatus 100, the edge device 400", and the server 200" according to the present embodiment will be described next with reference to the flowchart in FIG. 25. In FIG. 25, steps in which the same operations as in the ninth embodiment are carried out have been given the same reference numerals as those in FIG. 22. Operations that are the same as in the ninth embodiment will not be described, and the following will focus on operations characteristic to the present embodiment.

A maximum number of instances of RAW data to be transmitted to the external apparatus is set in the ROM 102 of the image capture apparatus 100 according to the present embodiment. This setting may be changeable by the user. Individual maximum numbers may also be set in accordance with the destination or method of communication. For example, a maximum number is set for communication using a mobile phone communication network (communication that incurs a cost based on the amount of data communication), and a maximum number is not set (or is set to be unlimited) for communication using wireless LAN (communication for which no costs are incurred). Furthermore, a maximum number is set for communication with the server 200", whereas a maximum number is not set for communication with the edge device 400". The maximum number may be a number of RAW data files (a number of instances of data), or may be an amount of data transmitted. Note that a number of transmitted files, an amount of data communication, and so on to be compared with the maximum number are reset every predetermined period (e.g., every month, every week, every day, or the like).

The operations performed up until the rating information is received and the transmission order is determined (i.e., up to step S2206) may be the same as in the ninth embodiment (or the tenth embodiment).

In step S2501, the image capture apparatus 100 refers to the RAM 103, for example, and determines whether or not a current transmission number is less than the maximum number. If the current transmission number is not less than the maximum number, the image capture apparatus 100 does not send anymore RAW data. On the other hand, if the current transmission number is less than the maximum number, in step S2207, the image capture apparatus 100 transmits the next RAW data to the server 200" in accordance with the transmission order. After the transmission, the image capture apparatus 100 applies the information of the RAW data transmitted most recently to the number of transmitted files, the amount of data communication, and so on stored in the RAM 103. Then, if untransmitted RAW data remains, the image capture apparatus 100 executes step S2501 again. Note that if the maximum number is a data amount, even if the current transmission number is less than the maximum number, the next RAW data is not transmitted in the event that the maximum number is exceeded during the transmission of the next RAW data.

The operations from step S2207 may be the same as in the ninth embodiment (or the tenth embodiment), and therefore will not be described.

The same effects as those of the ninth embodiment (or the tenth embodiment) can be achieved by the present embodiment as well. Additionally, setting the maximum number to a value that takes into account, for example, a maximum monthly communication charge in a mobile communication contract makes it possible to prevent the transmission of RAW data in an environment where mobile communication is used from exceeding the maximum amount of communication.

Twelfth Embodiment

A twelfth embodiment of the present invention will be described next. The present embodiment differs from the ninth embodiment in that when transmitting the RAW data to the external apparatus in accordance with the transmission order determined on the basis of the evaluation values, a remaining amount of data that can be transmitted to the server is taken into account. The present embodiment, too, can be carried out by the same image processing system as that described in the sixth embodiment, and thus the configurations of the image capture apparatus 100, the server 200", and the edge device 400" will not be described.

Figure 26:
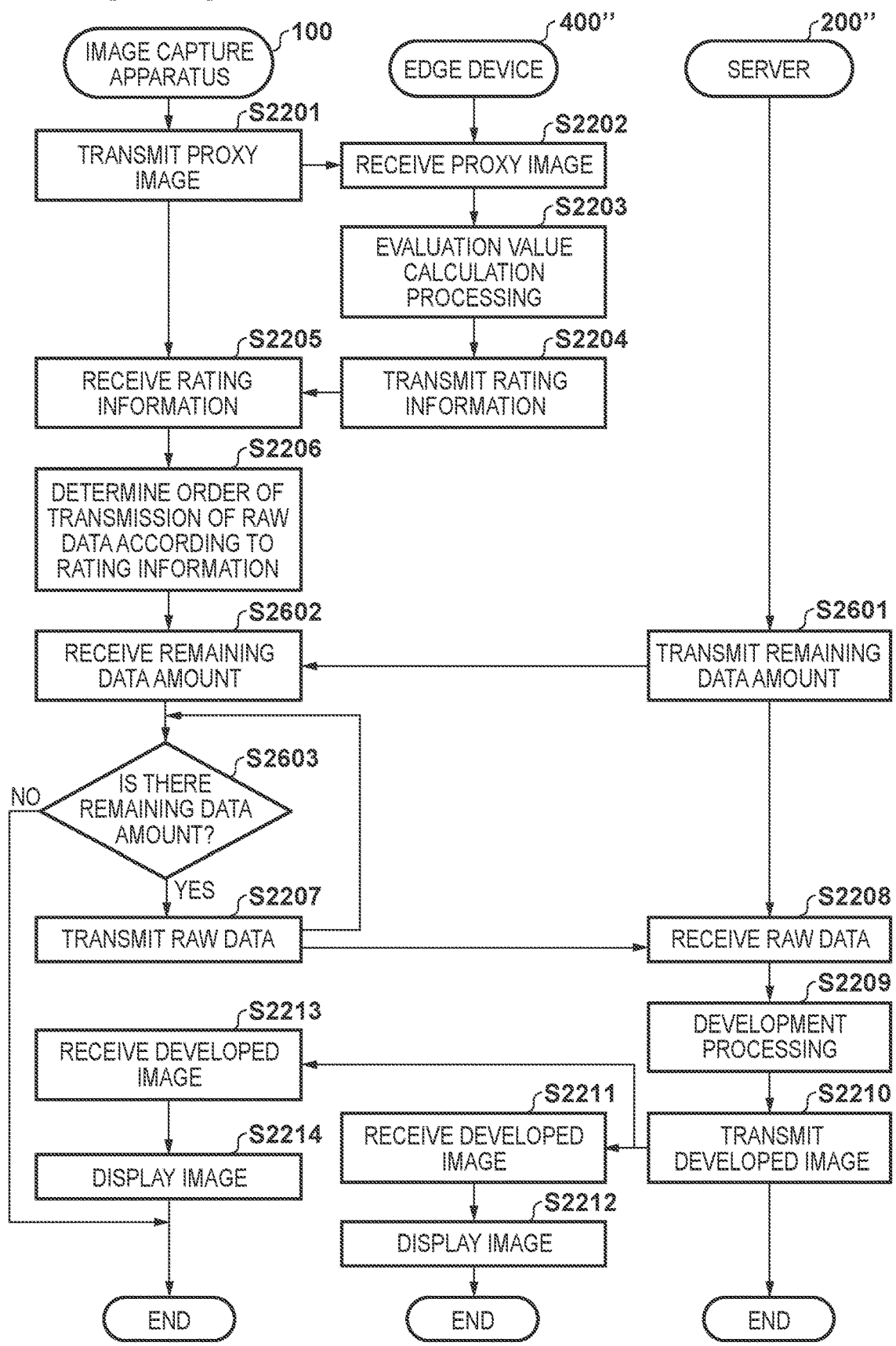
FIG. 26 is a flowchart pertaining to a twelfth embodiment.

Interactive operations between the image capture apparatus 100, the edge device 400", and the server 200" according to the present embodiment will be described next with reference to the flowchart in FIG. 26. In FIG. 26, steps in which the same operations as in the ninth embodiment are carried out have been given the same reference numerals as those in FIG. 22. Operations that are the same as in the ninth embodiment will not be described, and the following will focus on operations characteristic to the present embodiment.

In the server 200" according to the present embodiment, a usable storage amount in the storage device 205 is set for each user, and a usage amount is managed for each user. The usage amount is managed in association with, for example, unique information of the user or the image capture apparatus 100. The server 200" can manage the usage amount on the basis of the unique information of the image capture apparatus or the user from which the RAW data is received.

The operations performed up until the rating information is received and the transmission order is determined (i.e., up to step S2206) may be the same as in the ninth embodiment (or the tenth embodiment).

In step S2601, the server 200" calculates a difference between a maximum value of the usable storage amount set for the image capture apparatus 100 or the user and a current usage amount as the remaining data amount, and transmits the remaining data amount to the image capture apparatus 100. Note that step S2601 can be executed at any time between when the server 200" and the image capture apparatus 100 enter a communicative state and when the image capture apparatus 100 begins transmitting the RAW data.

In step S2602, the image capture apparatus 100 receives the remaining data amount from the server 200" and stores the remaining data amount in the RAM 103.

In step S2603, the image capture apparatus 100 determines whether or not the received remaining data amount is greater than or equal to a data amount of the RAW data to be transmitted next. When the remaining data amount is not greater than or equal to the data amount of the RAW data to be transmitted next, the image capture apparatus 100 does not transmit any of the subsequent RAW data. On the other hand, when the remaining data amount is greater than or equal to the data amount of the RAW data to be transmitted next, the image capture apparatus 100 executes step S2207 and transmits the RAW data to the server. After the transmission, the image capture apparatus 100 updates the remaining data amount by reducing the remaining data amount stored in the RAM 103 by the data amount of the RAW data transmitted most recently. Then, if untransmitted RAW data remains, the image capture apparatus 100 executes step S2603 again.

The operations from step S2207 may be the same as in the ninth embodiment (or the tenth embodiment), and therefore will not be described.

The same effects as those of the ninth embodiment (or the tenth embodiment) can be achieved by the present embodiment as well. Additionally, if there is a limit on the amount of data which can be stored in the server 200" (or the data amount to which the image processing can be applied), the image processing can be applied preferentially to RAW data for which the image processing performed by the server 200" has the greatest effect. Note that a value obtained by converting the remaining data amount into a number of RAW data files using a typical data size of the RAW data may be used instead of the remaining data amount.

Thirteenth Embodiment

A thirteenth embodiment of the present invention will be described next. The present embodiment differs from the ninth embodiment in that the rating information generated by the edge device 400" is transmitted to the server 200", and the rating information is then generated again taking into account the rating information for RAW data stored in the server 200". The present embodiment, too, can be carried out by the same image processing system as that described in the sixth embodiment, and thus the configurations of the image capture apparatus 100, the server 200", and the edge device 400" will not be described.

Figure 27:
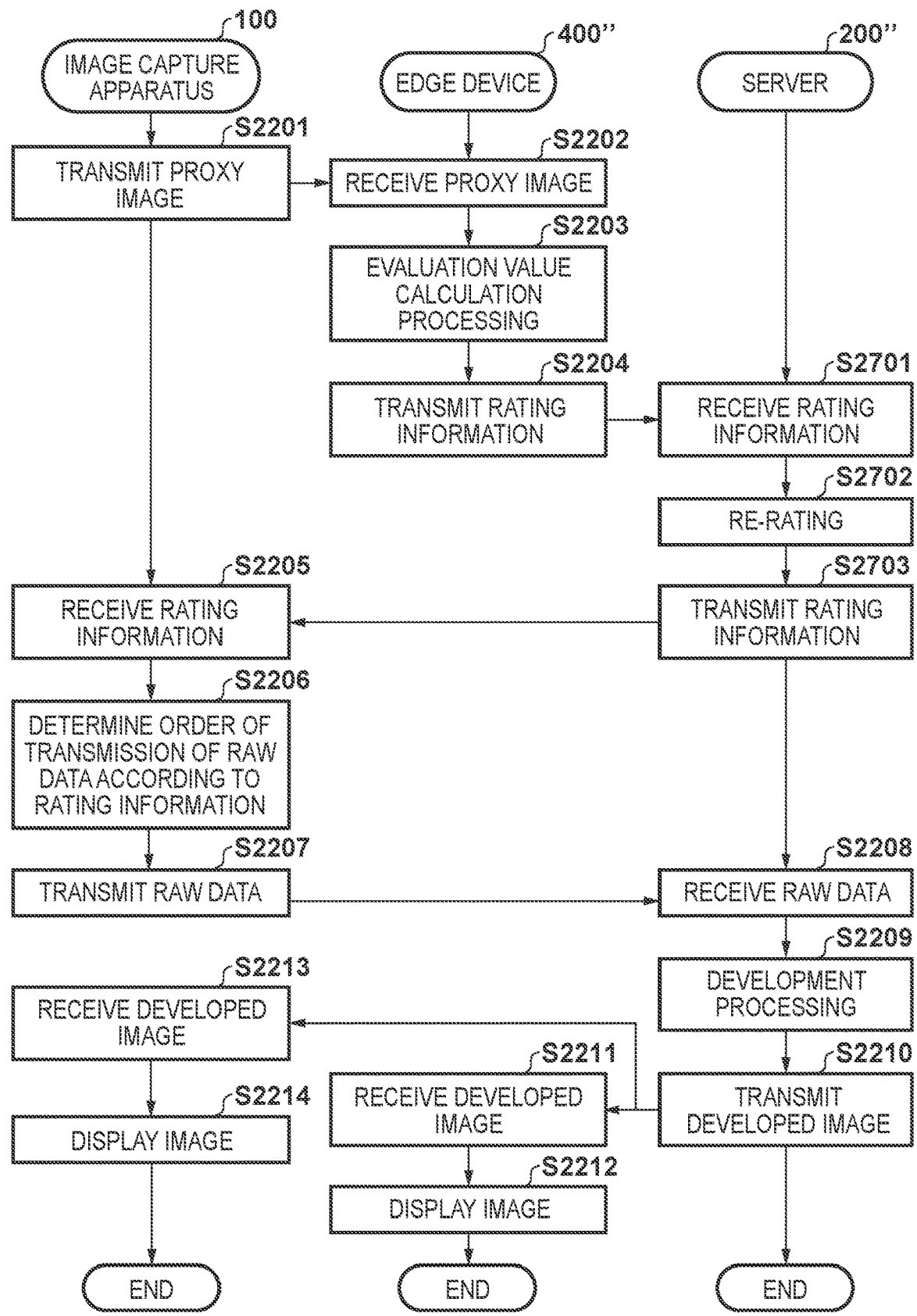
FIG. 27 is a flowchart pertaining to a thirteenth embodiment.

Interactive operations between the image capture apparatus 100, the edge device 400", and the server 200" according to the present embodiment will be described next with reference to the flowchart in FIG. 27. In FIG. 27, steps in which the same operations as in the ninth embodiment are carried out have been given the same reference numerals as those in FIG. 22. Operations that are the same as in the ninth embodiment will not be described, and the following will focus on operations characteristic to the present embodiment.

The operations performed up until the rating information is generated by the edge device 400" (i.e., up to step S2204) may be the same as in the ninth embodiment (or the tenth embodiment). However, in the present embodiment, the edge device 400" transmits the rating information to the server 200" instead of the image capture apparatus 100 in step S2204.

In step S2701, the server 200" receives the rating information from the edge device 400" and stores the rating information in the RAM 202.

The server 200" holds, in the storage device 205 of the server 200", rating information for the RAW data associated with the image capture apparatus 100 or that user. This rating information is continuously updated on the basis of rating information received from the edge device 400" in the past, and includes a predetermined number of evaluation values from the highest value and information of the corresponding RAW data.

In step S2702, the server 200" updates the rating information stored in the storage device 205 using the rating information received from the edge device 400" in step S2701 (re-rating processing). Specifically, the server 200" rearranges a plurality of evaluation values included in two instances of the rating information in order from the highest value, and stores the information of the RAW data corresponding to a predetermined number of evaluation values from the highest value in the storage device 205 as the rating information. Note that the maximum number of evaluation values (instances of RAW data) included in the rating information stored in the storage device 205 can be set to the maximum number of instances of RAW data that can be stored by the user in the storage device 205.

Additionally, of the new rating information generated through the re-rating processing, the server 200" extracts only the information pertaining to RAW data not present in the server 200", and generates rating information to be transmitted to the image capture apparatus 100. Of the RAW data stored in the storage device 205, RAW data which is no longer included in the rating information updated through the re-rating processing can be deleted to free up space in the storage device 205.

In step S2703, the server 200" transmits, to the image capture apparatus 100, the rating information generated for the image capture apparatus.

The operations from step S2205 and on are the same as in the ninth embodiment, and will therefore not be described here.

According to the present embodiment, when the number of instances, size, and so on of data that can be stored in the server 200" are limited, data for which the image processing by the server 200" will have a greater effect (data having a higher evaluation value) can be stored in the server 200".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-006219, filed on Jan. 17, 2020, Japanese Patent Application No. 2020-069279, filed on Apr. 7, 2020, and Japanese Patent Application No. 2020-186751, filed on Nov. 9, 2020, which are hereby incorporated by reference herein in their entirety.

What is claimed is:

1. An image processing apparatus comprising a communication circuit and a control circuit,
wherein the control circuit:
receives reduced image data from an information processing apparatus through the communication circuit,
applies evaluation processing to the reduced image data,
transmits a result of the evaluation processing to the information processing apparatus through the communication circuit,
receives image data having a higher resolution than the reduced image data from the information processing apparatus through the communication circuit,
applies predetermined image processing to the image data, and
transmits a result of the image processing to the information processing apparatus through the communication circuit.

2. The image processing apparatus according to claim 1, wherein the image processing apparatus communicates with the information processing apparatus over a network that incurs a cost for use or a communication amount.

3. The image processing apparatus according to claim 1, wherein the control circuit further:
determines image data to which the image processing is to be applied from a plurality of frames' worth of image data received from the information processing apparatus, and
applies the image processing to the determined image data.

4. The image processing apparatus according to claim 1, wherein the control circuit further:
receives a plurality of frames' worth of image data from the information processing apparatus through the communication circuit,
determines image data to which predetermined image processing is to be applied from the plurality of frames' worth of image data, and
transmits the determined image data to an apparatus different from the information processing apparatus through the communication circuit.

5. A control method for an image processing apparatus, the method comprising:
receiving reduced image data from an information processing apparatus through a communication circuit of the image processing apparatus;
applying evaluation processing to the reduced image data;
transmitting a result of the evaluation processing to the information processing apparatus through the communication circuit;
receiving image data having a higher resolution than the reduced image data from the information processing apparatus through the communication circuit;
applying predetermined image processing to the image data; and
transmitting a result of applying the image processing to the information processing apparatus through the communication circuit.

6. A non-transitory computer-readable medium storing a program for causing a computer to function as an image processing apparatus comprising:
a communication unit; and
a control unit,
wherein the control unit:
receives reduced image data from an information processing apparatus through the communication unit,
applies evaluation processing to the reduced image data,
transmits a result of the evaluation processing to the information processing apparatus through the communication unit,
receives image data having a higher resolution than the reduced image data from the information processing apparatus through the communication unit,
applies predetermined image processing to the image data, and
transmits a result of the image processing to the information processing apparatus through the communication unit.

* * * * *